United States Patent
Tsubusaki

(10) Patent No.: US 9,344,634 B2
(45) Date of Patent: May 17, 2016

(54) IMAGING APPARATUS HAVING SUBJECT DETECTION FUNCTION, METHOD FOR CONTROLLING THE IMAGING APPARATUS, AND STORAGE MEDIUM

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 14/338,032

(22) Filed: Jul. 22, 2014

(65) Prior Publication Data
US 2015/0029347 A1 Jan. 29, 2015

(30) Foreign Application Priority Data

Jul. 24, 2013 (JP) ................................ 2013-153787
Jan. 21, 2014 (JP) ................................ 2014-008876

(51) Int. Cl.
*H04N 5/232* (2006.01)

(52) U.S. Cl.
CPC ....... *H04N 5/23296* (2013.01); *H04N 5/23219* (2013.01); *H04N 5/23254* (2013.01); *H04N 5/23258* (2013.01); *H04N 5/23293* (2013.01); *G03B 2217/18* (2013.01)

(58) Field of Classification Search
CPC .......... H04N 5/23296; H04N 5/23222; H04N 5/23251–5/23258; H04N 5/23293
See application file for complete search history.

(56) References Cited

U.S. PATENT DOCUMENTS

| 9,204,053 B2* | 12/2015 | Matsuzawa | ........ H04N 5/23296 |
| 2012/0062692 A1* | 3/2012 | Tsubusaki | .......... H04N 5/23296 348/36 |
| 2014/0139667 A1* | 5/2014 | Kang | ................. H04N 5/23296 348/143 |
| 2014/0168448 A1* | 6/2014 | Ozawa | ............... H04N 5/23216 348/170 |

FOREIGN PATENT DOCUMENTS

| JP | H06-005910 A | 1/1994 |
| JP | H06-005912 A | 1/1994 |
| JP | 2012-060595 A | 3/2012 |

* cited by examiner

*Primary Examiner* — Paul Berardesca
(74) *Attorney, Agent, or Firm* — Canon USA Inc., IP Division

(57) ABSTRACT

A subject detection apparatus includes a subject detection unit configured to detect a subject included in an image, an orientation detection unit configured to detect an orientation of the subject detection apparatus, and a control unit configured to control a zoom magnification according to an area of the subject detected by the subject detection unit. If the area of the subject detected by the subject detection unit enters a designated area of the image, the control unit controls the zoom magnification so as to become a zoom magnification in a wide angle direction. The designated area is set according to a detection result obtained by the orientation detection unit.

22 Claims, 18 Drawing Sheets

109

300

300

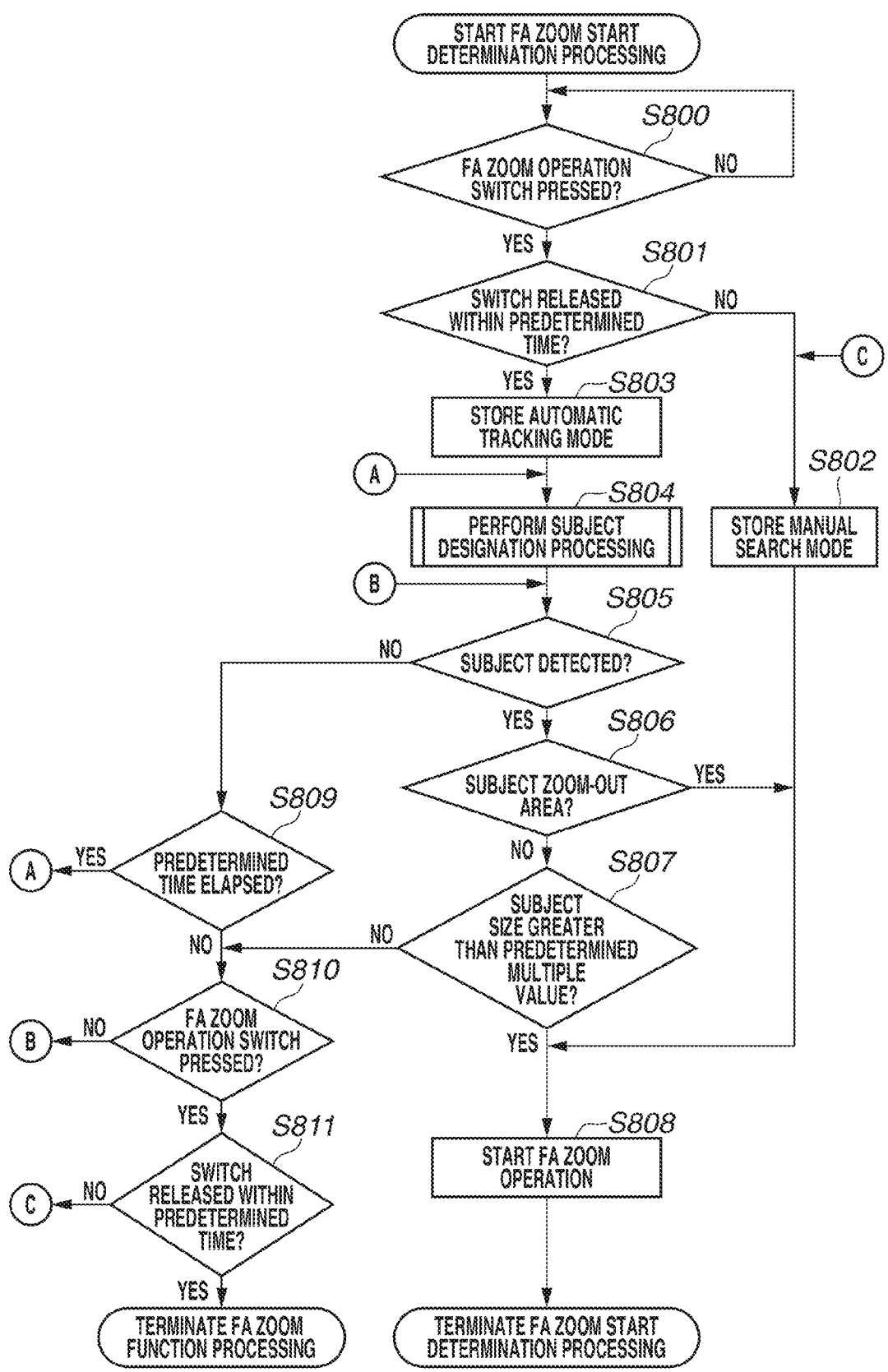

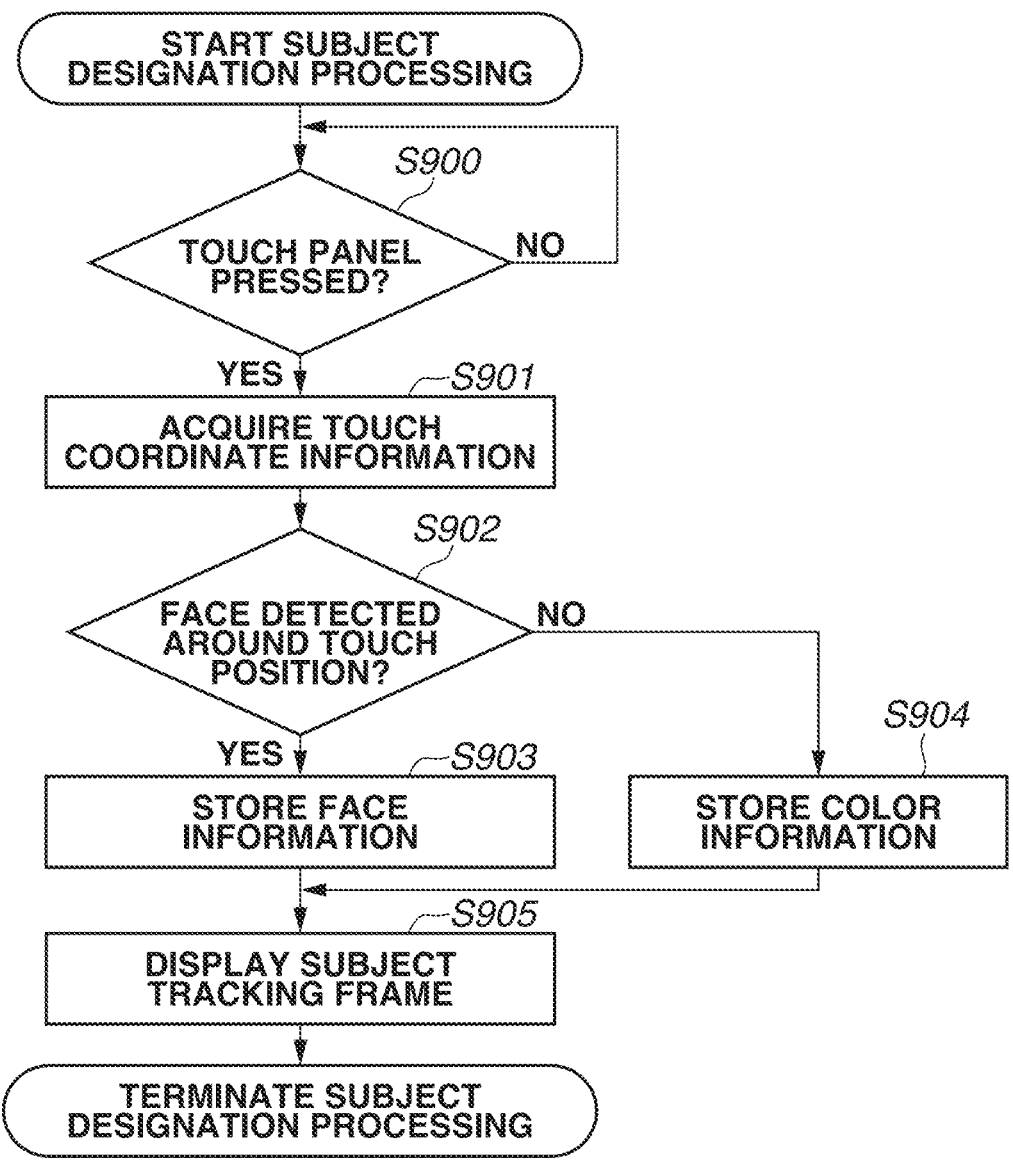

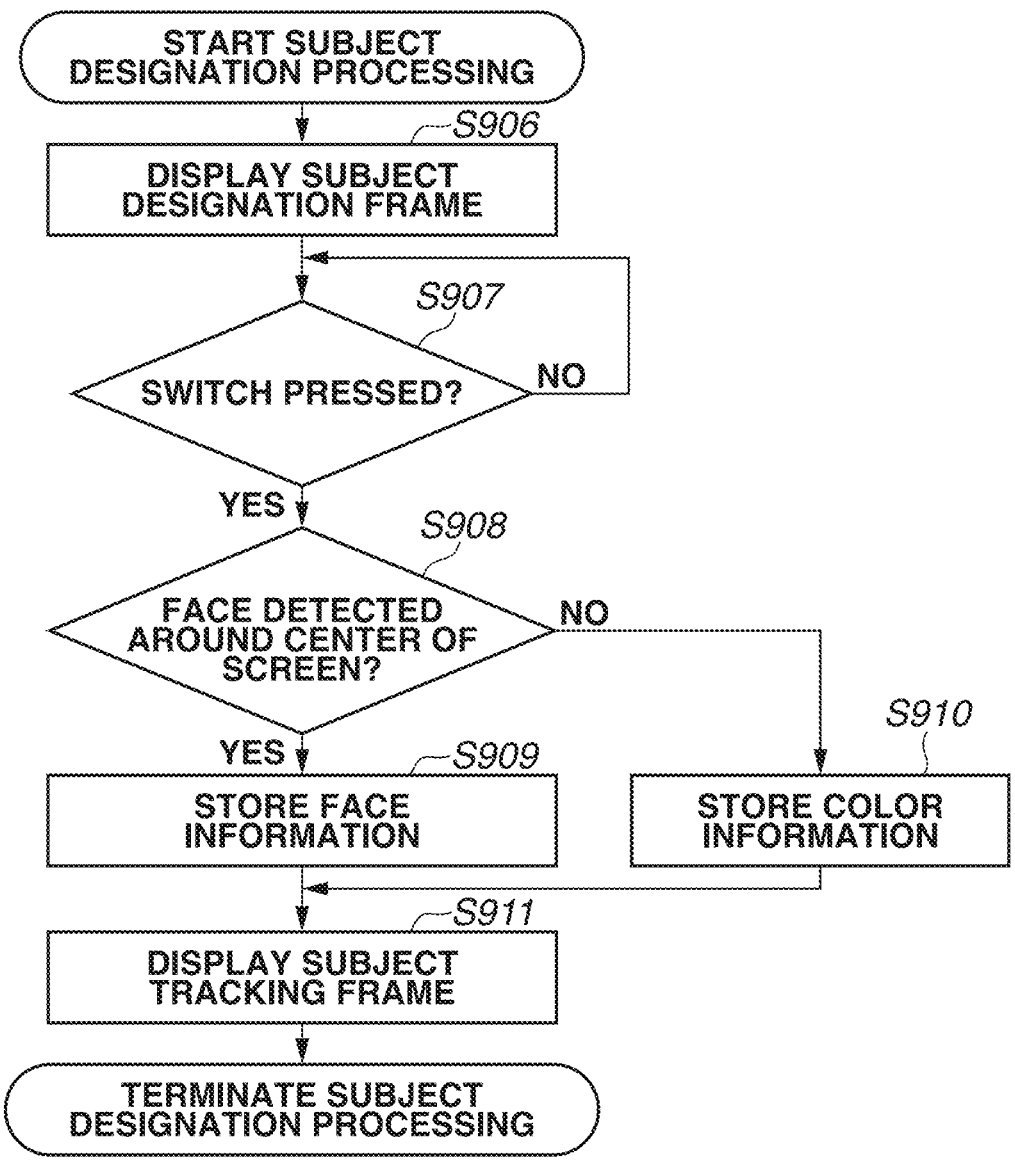

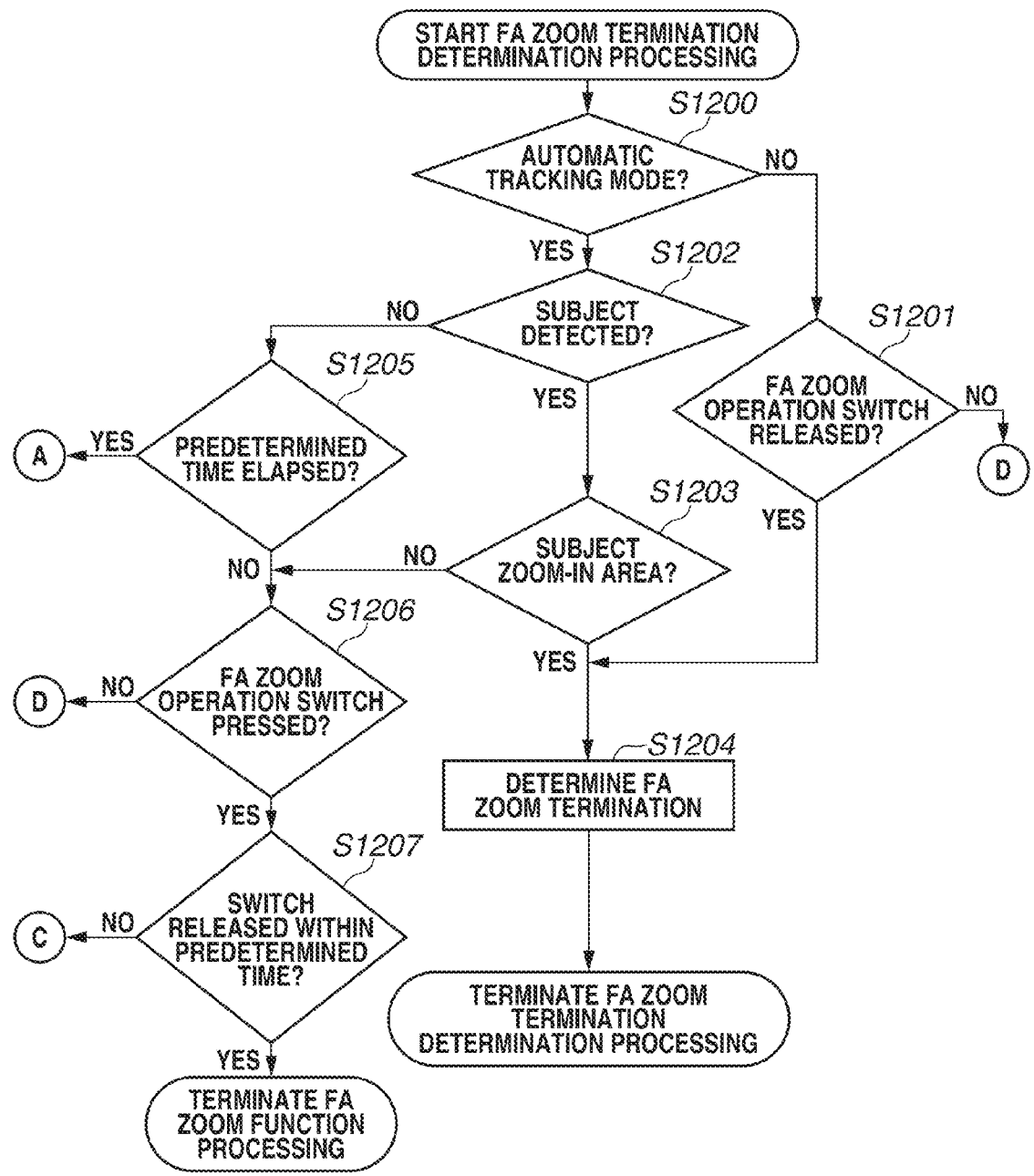

FIG. 14

| SUBJECT | SHAKE | ORIENTATION | DIRECTION | Z0/Z1 AREA BASIC SETTING | OCCUPATION RATE OF Z0 AREA IN HORIZONTAL DIRECTION OF SCREEN | OCCUPATION RATE OF Z1 AREA IN HORIZONTAL DIRECTION OF SCREEN |
|---|---|---|---|---|---|---|
| HUMAN OBJECT | HANDHELD | REGULARLY POSITIONED | HORIZONTAL DIRECTION | LONGITUDINAL RATE < SHORT-LENGTH RATE | UPPER PART RATE = LOWER PART RATE | UPPER PART RATE = LOWER PART RATE |
| | | | DOWNWARD DIRECTION | | UPPER PART RATE < LOWER PART RATE | UPPER PART RATE > LOWER PART RATE |
| | | | UPWARD DIRECTION | | UPPER PART RATE > LOWER PART RATE | UPPER PART RATE < LOWER PART RATE |
| | | VERTICALLY POSITIONED | HORIZONTAL DIRECTION | LONGITUDINAL RATE > SHORT-LENGTH RATE | UPPER PART RATE = LOWER PART RATE | UPPER PART RATE = LOWER PART RATE |
| | | | DOWNWARD DIRECTION | | UPPER PART RATE < LOWER PART RATE | UPPER PART RATE > LOWER PART RATE |
| | | | UPWARD DIRECTION | | UPPER PART RATE > LOWER PART RATE | UPPER PART RATE < LOWER PART RATE |
| NONHUMAN | — | — | — | LONGITUDINAL RATE = SHORT-LENGTH RATE | UPPER PART RATE = LOWER PART RATE | UPPER PART RATE = LOWER PART RATE |
| — | FIXED | — | — | | | |

IMAGING APPARATUS HAVING SUBJECT DETECTION FUNCTION, METHOD FOR CONTROLLING THE IMAGING APPARATUS, AND STORAGE MEDIUM

BACKGROUND OF THE INVENTION

1. Field of the Invention

The present invention relates to an imaging apparatus having a subject detection function and a zoom function. Further, the present invention relates to a method of controlling the imaging apparatus to perform the subject detection function and the zoom function.

2. Description of the Related Art

There is a conventional imaging apparatus (such as a digital camera) that has an optical zoom function and an electronic zoom function. The optical zoom function is an optical magnification varying function that can be realized by driving a zoom lens to change the focal length of the camera. The electronic zoom function is an electronic magnification varying function that enlarges a part of an imaged area digitally by cropping an image with no adjustment of the camera's optics. Recent improvement in zoom lens performance enables a photographer to perform a shooting operation using the same lens in an enlarged range from a super wide angle end to a super telephoto end. Further, the highly increased number of pixels of newer image sensors enables a photographer to perform a shooting operation in satisfactory resolution even when magnification is high.

However, even with advanced optical and semiconductor improvements, movement of either the subject or the camera represents a challenge during imaging. As discussed in Japanese Patent Application Laid-Open No. 2012-60595, it is conventionally known to immediately recapture a subject when the subject goes out of the frame. The above-mentioned function is referred to as framing assist (FA) zoom function (hereinafter, referred to as an FA zoom function). The apparatus discussed in Japanese Patent Application Laid-Open No. 2012-60595 can cause the zoom position of a camera to zoom out toward the wide angle direction in response to an instruction to start the FA zoom function, and can cause the zoom position to zoom in toward the original zoom position (i.e., to the zoom position set at the start timing of the FA zoom function) in response to an instruction to terminate the FA zoom function.

On the other hand, it is also known that when a camera detects a subject in the screen, the camera can automatically change the zoom position according to information about the detected subject. Such a function is conventionally known as automatic zoom function. Further, as discussed in Japanese Patent No. 1881884, it is conventionally known to cause the zoom position to zoom out toward the wide angle direction when a subject has reached a limit position of a specific area of the screen. Further, as discussed in the Japanese Patent No. 2052653, it is conventionally known to cause the zoom position to zoom in toward the telephoto direction when a subject is located at a central region of the screen.

The methods discussed in Japanese Patent Application Laid-Open No. 2012-60595 and Japanese Patent No. 1881884 are characterized by manually changing the specific area of the screen (i.e., a zoom start area) to be set to detect a subject and determine to start a zoom operation. Further, in a case where information about a detected human face is used to realize the automatic zoom function, if the zoom start area is set at an upper part of the screen, a photographer performs a shooting operation with a composition in which the bust of a human or the whole body is included, the face area may enter the zoom start area and the camera may erroneously start a zoom-out operation. On the other hand, when a photographer performs a shooting operation while holding the camera in a hand, the subject may enter the zoom start area due to camera shake or similar situation. In this case, the photographer can perform a framing operation in such a way as to correct the degree of frame out. However, if the camera immediately performs a zoom-out operation, the photographer may feel it troublesome.

SUMMARY OF THE INVENTION

The embodiments of present invention are directed to a technique of realizing appropriate zoom operations according to information about a subject or the orientation of a camera, when a camera detects the subject in a specific area of the screen and determines to start the zoom operation.

According to one aspect of the present invention, a subject detection apparatus includes a subject detection unit configured to detect a subject included in an image, an orientation detection unit configured to detect an orientation of the subject detection apparatus, and a control unit configured to control a zoom magnification according to an area of the subject detected by the subject detection unit. The control unit is configured to control the zoom magnification so as to become a zoom magnification in a wide angle direction if the area of the subject detected by the subject detection unit enters a designated area of the image. The designated area is set according to a detection result obtained by the orientation detection unit.

Further features of the present invention will become apparent from the following description of exemplary embodiments with reference to the attached drawings.

BRIEF DESCRIPTION OF THE DRAWINGS

FIG. 8 is a flowchart illustrating FA zoom start determination processing that can be performed by the camera.

FIGS. 9A, 9B, and 9C are flowcharts illustrating subject designation processing that can be performed by the camera.

FIG. 12 is a flowchart illustrating FA zoom termination determination processing that can be performed by the camera.

FIG. 14 is a table illustrating settings with respect to a subject, orientation, and shake detection result in relation to zoom start area.

DESCRIPTION OF THE EMBODIMENTS

Various exemplary embodiments, features, and aspects of the invention will be described in detail below with reference to the attached drawings. The function that can be realized according to an exemplary embodiment can support a photographer to perform a framing operation, which can be referred to as a framing support zoom function or a framing assist zoom function (hereinafter, simply described as an "FA zoom function").

Figure 1:
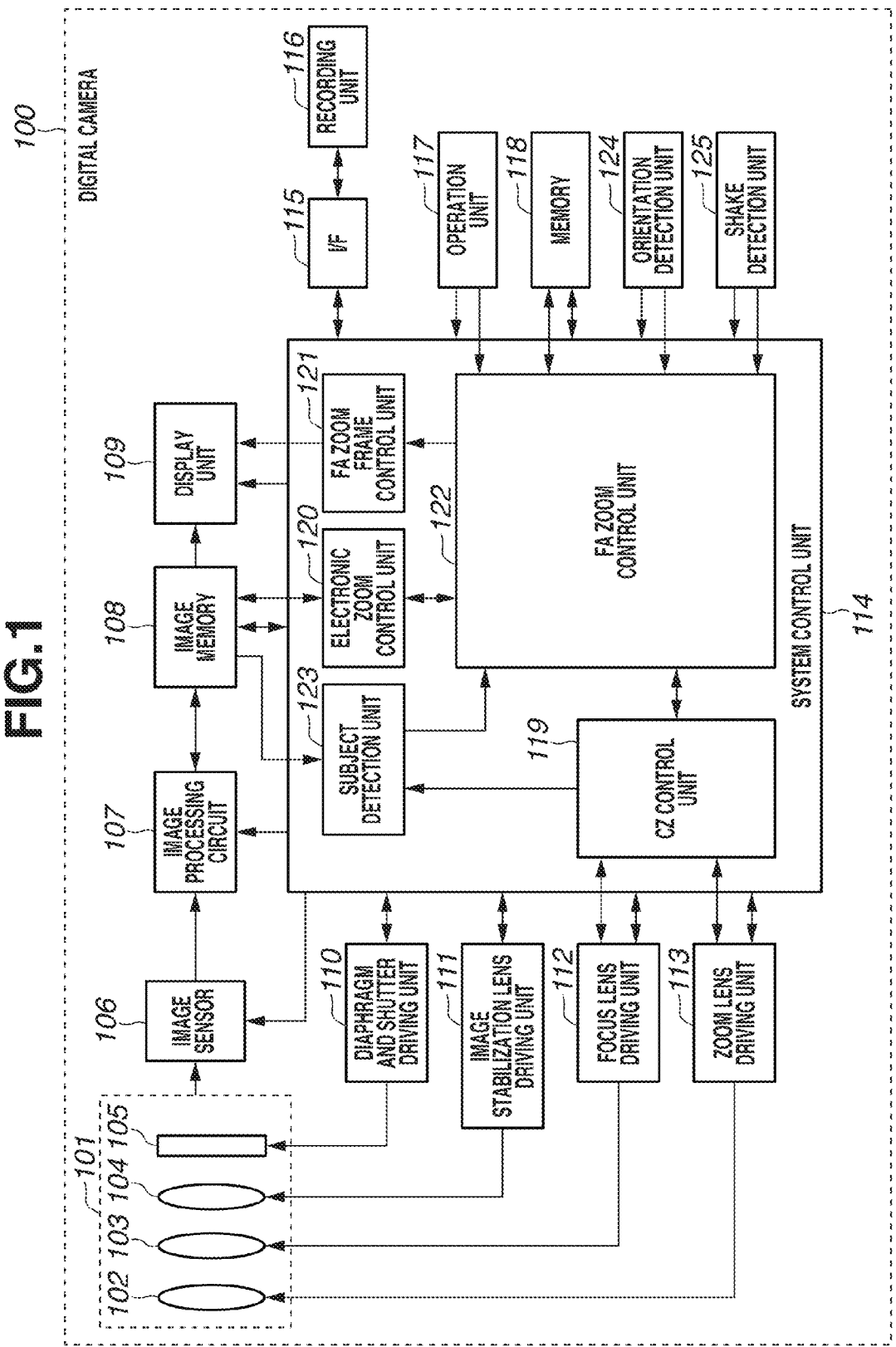
FIG. 1 is a block diagram illustrating a configuration example of a digital camera according to an exemplary embodiment.

FIG. 1 is a block diagram illustrating a configuration example of a digital camera 100, which is an example of an imaging apparatus that includes a subject detection apparatus according to the present exemplary embodiment. The digital camera 100 is configured to perform the FA zoom function based on specific novel algorithms described in detail below.

A lens barrel 101 supports a lens group provided therein. Within the lens group, a zoom lens 102 is movable in an optical axis direction to adjust the focal length and can optically change the angle of view. A focus lens 103 is movable in the optical axis direction to adjust the focusing state. An image stabilization lens 104 is a correction lens that can prevent an image shake that may occur when the camera 100 shakes. A diaphragm and shutter 105 is configured to adjust the quantity of light passing therethrough, and can be used for exposure control. The digital camera 100 according to the present exemplary embodiment is an imaging apparatus that includes the lens barrel 101 that is integrated with a camera body. However, the digital camera 100 according to the present exemplary embodiment is not limited to the above-mentioned example. The present exemplary embodiment is applicable to an imaging system that includes a camera body and an interchangeable lens, in which the lens barrel 101 is interchangeably attachable to and detachable from the camera body.

The light passed through the lens barrel 101 can be received by an image sensor 106 such as a charge coupled device (CCD) sensor or a complementary metal oxide semiconductor (CMOS) sensor. The image sensor 106 can generate an image capturing signal by photoelectrically converting an image of a target being imaged into an electric signal. The image capturing signal can be input to an image processing circuit 107. The image processing circuit 107 can perform various kinds of processing, including pixel interpolation processing and color conversion processing, on the input image capturing signal. The image processing circuit 107 outputs the processed image data (i.e., the image data having been subjected to various processing) to an image memory 108. The image memory 108 is a storage unit that includes a dynamic random access memory (DRAM) or a static random access memory (SRAM).

A display unit 109 is configured to include a thin film transistor (TFT) driving type liquid crystal display device (TFT type LCD). The display unit 109 can display specific information (e.g., shooting information and an FA zoom frame described below) together with a captured image (image data). Through the above-mentioned information display including a live view image, the display unit 109 can realize an electronic view finder (EVF) function that enables a photographer to adjust the angle of view.

A diaphragm and shutter driving unit 110 can calculate exposure control values (e.g., a diaphragm value and a shutter speed) based on luminance information obtained through the image processing performed by the image processing circuit 107. The diaphragm and shutter driving unit 110 are implemented by one or more electronic controllers that drive(s) the diaphragm and shutter 105 based on the calculation result. In other words, the diaphragm and shutter driving unit 110 can perform an automatic exposure (AE) control. An image stabilization lens driving unit 111 can calculate a shake amount added to the digital camera 100 based on information obtained from an angular speed sensor (e.g., a gyro sensor). The image stabilization lens driving unit 111 can drive the image stabilization lens 104 in such a way as to cancel (reduce) the shake.

A focus lens driving unit 112 can drive the focus lens 103. The digital camera 100 according to the present exemplary embodiment performs an automatic focus (AF) control according to a contrast method. Therefore, the focus lens driving unit 112 drives the focus lens 103 in such a way as to bring the subject into a focusing state based on focal adjustment information (e.g., a contrast evaluation value) of an imaging optical system obtained through the image processing performed by the image processing circuit 107. However, the present exemplary embodiment is not limited to the above-mentioned example. For example, the digital camera 100 can be configured to perform the AF control according to a phase difference AF method or any other appropriate AF control method other than the contrast method. Further, the digital camera 100 can be configured to perform the AF control in such a way as to use a plurality of methods (e.g., a combination of the contrast method and another method).

A zoom lens driving unit 113 can drive the zoom lens 102 according to a zoom operation instruction. The operation unit 117 includes a zoom lever or a zoom button, which is operable as a zoom operation member that allows a photographer to instruct the camera to perform a zoom operation. The system control unit 114 calculates a zoom driving speed and a driving direction based on an operation amount and an operation direction of the zoom operation member to be used in a zoom instruction operation. The system control unit 114 causes the zoom lens 102 to move along the optical axis according to the calculation result.

The image data generated through a shooting operation can be transmitted to and recorded in a recording unit 116 via an interface unit (hereinafter, referred to as "I/F unit") 115. Specifically, the image data can be recorded on an external recording medium (e.g., a memory card) that can be attached to the digital camera 100 and/or in a built-in nonvolatile memory 118 provided in the digital camera 100.

The operation unit 117 includes a release switch that is operable to instruct starting a shooting operation, and an FA zoom operation switch that is operable to instruct starting or terminating the FA zoom function. The FA zoom operation switch is in addition to the zoom operation member. When a signal is input via the operation unit 117, the input signal can be transmitted to the system control unit 114 (system microprocessor, controller or CPU). The information stored in the memory 118 is not limited to program data and image data. The information stored in the memory 118 includes setting information about the digital camera 100 and FA zoom function related information (e.g., a zoom-in position) described in detail below. In the present exemplary embodiment, the zoom-in position is a target zoom return position when the zoom-in operation is performed after the FA zoom operation is terminated, as described in more detail below.

The system control unit 114 (i.e., a control unit according to the present exemplary embodiment) is configured to include a calculation apparatus, such as a central processing unit (CPU). The system control unit 114 can control various operations to be performed by the digital camera 100 by transmitting a control command to each unit of the digital camera 100 in response to an operation of a photographer. The system control unit 114 can execute various control programs stored in the memory 118. For example, the control programs that can be executed by the system control unit 114 include a program relating to a control of the image sensor 106, a program relating to an AE/AF control, and a program relating to a zoom control (including FA zoom processing).

Next, an FA zoom function related control, which can be performed by the system control unit 114, is described in detail below. As illustrated in FIG. 1, the system control unit 114 includes a computer zoom (CZ) control unit 119, an electronic zoom control unit 120, an FA zoom frame control unit 121, an FA zoom control unit 122, and a subject detection unit 123.

Figure 2:
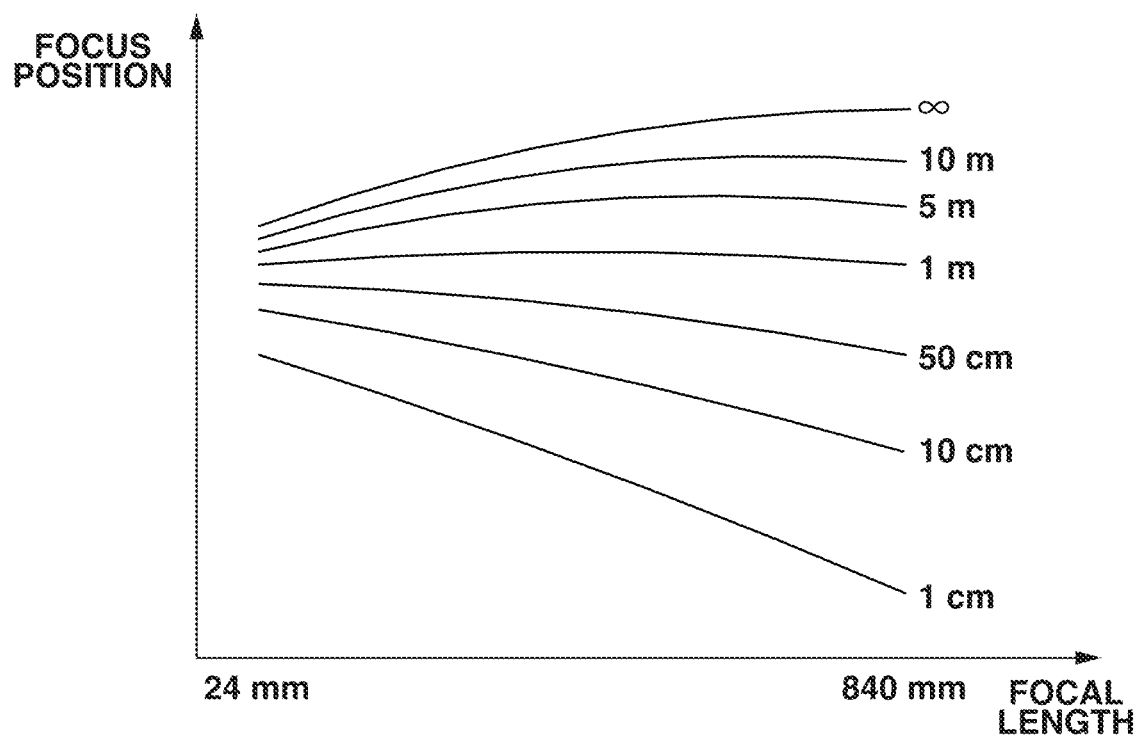
FIG. 2 is a graph illustrating a relationship between a focal length and a focus lens position in respective subject distances.

To maintain an in-focus state while the angle of view varies during an optical zoom operation, it is necessary to cause the focus lens 103 to move to an appropriate focus position according to the position of the zoom lens 102 because the lens barrel 101 is a rear focus type. The above-mentioned control is referred to as a computer zoom control. FIG. 2 illustrates a relationship between the focal length of the zoom lens and the focus position of each subject distance. The graph illustrated in FIG. 2 is a data table that indicates the relationship between the focal length of the zoom lens and the in-focus position for each distance of the subject. In the present exemplary embodiment, the table illustrated in FIG. 2 is referred to as a focus cam table. In FIG. 2, the abscissa axis represents the focal length corresponding to the zoom position and the ordinate axis represents the focus position. A numerical value attached to each graph line indicates the distance from the digital camera 100 to the subject (i.e., the subject distance).

The system control unit 114 performs a scan operation by controlling the focus lens driving unit 112 to cause the focus lens 103 to move in a predetermined range when the system control unit 114 performs the AF control. The system control unit 114 detects the focus position (i.e., an in-focus point) based on a contrast evaluation value obtained during the above-mentioned operation according to a well-known method. The system control unit 114 can measure the subject distance based on the zoom position and the focus position obtained at that time, with reference to the focus cam table.

The digital camera 100 has an optical zoom function and an electronic zoom function. The CZ control unit 119 and the zoom lens driving unit 113 cooperatively perform an optical zoom driving operation. The CZ control unit 119 detects a zoom position of the zoom lens 102 for each predetermined control period during a zoom operation. Then, the CZ control unit 119 drives the focus lens 103 in such a way as to follow up the data of the focus cam table according to the zoom position. Thus, it becomes feasible to perform an optical zoom operation while maintaining the in-focus state.

On the other hand, the electronic zoom control unit 120 and the image memory 108 cooperatively perform electronic zoom processing. The electronic zoom control unit 120 extracts a target area from image data transferred to the image memory 108 to realize the electronic zoom function. Further, the electronic zoom control unit 120 realizes a smooth electronic zoom display by causing the display unit 109 to display an image while gradually increasing the extraction range according to a frame rate period of an image captured by the image sensor 106.

The subject detection unit 123 detects a desired portion of a subject (subject area) from the image data stored in the image memory 108. In the present exemplary embodiment, a subject detection method (e.g., face detection processing and/or color detection processing) for distinguishing or determining a type of subject (e.g., a human object or a non-human object) based on face information or color information included in the image data is described below.

The face detection processing is characterized by detecting a face area (portion) of a human subject included in the image data according to a conventional algorithm. For example, the subject detection unit 123 extracts feature information from a partial area having a square shape of the image data and compares the extracted feature information with feature information of a face prepared beforehand. Then, if correlation between the compared features exceeds a predetermined threshold value, the subject detection unit 123 identifies the partial area as a face area. The subject detection unit 123 repeats the above-mentioned determination processing by variously changing the combination of partial area size, located position, and located angle to detect each face area that is present in the image data.

The color detection processing includes storing color information of a subject area designated according to a subject designation method described below as a characteristic color. The subject detection unit 123 performs the color detection processing when a subject (i.e., a detection target) is a non-human object. Signals output from the image processing circuit 107, such as RGB signals, luminance Y, and color differences R−Y and B−Y, are examples of the color information. In a subject detection operation, the subject detection unit 123 divides the image data into a plurality of partial areas and calculates an average luminance value and an average color difference value for each partial area. Further, the subject detection unit 123 compares the color information of each area obtained in the subject detection operation with characteristic color information related to desired subjects stored beforehand. If the difference in luminance and color difference is equal to or less than a predetermined value, the subject detection unit 123 designates the partial area as a candidate for subject area. Further, the subject detection unit 123 designates a partial area block that includes the designated area candidate and peripheral partial areas surrounding the area candidate as a same color area. If the size of the same color area is in a predetermined range, the subject detection unit 123 designates the area as a final subject area.

The subject detection unit 123 can estimate the size of the subject area included in the image data with reference to subject distance information measured by the CZ control unit 119 and focal length information of the zoom lens 102, in addition to the face information and the color information.

An orientation detection unit 124 can detect the orientation (e.g., regularly positioned/grip up/grip down/rotated at certain angle) of the digital camera 100 based on the information obtained by an acceleration sensor. FIGS. 13A, 13B, 13C, 13D, 13E, and 13F illustrate directions of x, y, and z axes in various orientations in a state where the acceleration sensor is provided on the digital camera 100. When the digital camera 100 is stationary, a composite vector of respective outputs of the x, y, and z axes indicates gravitation acceleration 1G. Detecting the orientation is feasible by calculating an angle formed between the gravitation vector and each axis. In the present exemplary embodiment, when a bottom surface of the camera is directed to the gravitation direction, the camera orientation is referred to as "regularly positioned". When a grip-side plane is directed to the gravitation direction or opposite to the gravitation direction, the camera orientation is referred to as "vertically positioned". More specifically, the camera orientation is classified into a plurality of groups according to an angle θ formed between the gravitation vector and the x axis on the x-y plane. For example, if the angle θ is in a range of −135°<θ−45°, the camera orientation is regularly positioned. If the angle θ is in a range of −45°<θ≤45°, the camera orientation is vertically positioned (grip down). If the angle θ is in a range of 135°<θ≤225°, the camera orientation is vertically positioned (grip up).

Next, the direction of the camera is described below. The direction of the camera (i.e., the up-and-down direction) is an angle φ formed between the gravitation vector and the optical axis direction of the lens barrel 101, i.e., the z-axis direction. For example, when the angle φ is 75°<φ≤105°, the camera direction is in a "horizontally directed" range. When the angle φ is 0°<φ≤75°, the camera direction is in a "downwardly directed" range. When the angle φ is 105°<φ≤180°, the camera direction is in an "upwardly directed" range. Accordingly, the orientation of the digital camera 100 illustrated in FIG. 13A can be referred to using an expression "regularly positioned/horizontally directed". The orientation of the digital camera 100 illustrated in FIG. 13B can be referred to using an expression "vertically positioned/horizontally directed". The orientation of the digital camera 100 illustrated in FIG. 13C can be referred to using an expression "regularly positioned/horizontally directed". The orientation of the digital camera 100 illustrated in FIG. 13D can be referred to using an expression "regularly positioned/downwardly directed". The orientation of the digital camera 100 illustrated in FIG. 13E can be referred to using an expression "vertically positioned/horizontally directed". The orientation of the digital camera 100 illustrated in FIG. 13F can be referred to using an expression "vertically positioned/downwardly directed".

A shake detection unit 125 can detect a shake state of the digital camera 100 based on the information obtained by a gyro sensor. If the shake amount applied to the gyro sensor is equal to or greater than a predetermined amount, the shake detection unit 125 determines that the digital camera 100 is in a handheld state. If the shake amount applied to the gyro sensor is less than the predetermined amount, the shake detection unit 125 determines that the digital camera 100 is fixed on a tripod or the like. The acceleration sensor and the gyro sensor to be used in the orientation detection and the shake detection can be configured as a sensor commonly used as control information about the image stabilization lens driving unit 111.

Next, the FA zoom function is schematically described below together with the FA zoom frame control unit 121 and the FA zoom control unit 122. The digital camera 100 according to the present exemplary embodiment is operable in a manual search mode and an automatic tracking mode (i.e., two modes selectable in performing the FA zoom operation). One of the above-mentioned modes can be selected when the subject goes out of the frame. When the selected mode is the manual search mode, a photographer can operate the FA zoom operation switch to capture the subject again. When the selected mode is the automatic tracking mode, the digital camera 100 automatically detects the subject and supports adjusting the angle of view. The function that can be realized by the digital camera 100 in each mode is schematically described below.

In a case where a camera has no FA zoom function, if a subject moves and goes out of the frame when a photographer is waiting for a shutter chance after performing a framing operation at a telephoto state, the photographer is required to perform the following operation. Specifically, first, the photographer searches for the subject by performing a zoom-out operation with the zoom operation member. Then, after completing the search of the subject, the photographer adjusts the angle of view by performing the zoom operation again to attain a desired angle of view.

On the other hand, in a case where the digital camera 100 has the manual search mode of the FA zoom function, a photographer may lose sight of a subject in a state where the angle of view is varying for a shooting operation (hereinafter, referred to as a shooting preparation state), the photographer can operate the FA zoom operation switch. The FA zoom operation switch is a specific switch dedicated to the FA zoom function and is a member different from the zoom operation member. The photographer can instruct the camera to start the FA zoom function by pressing the FA zoom operation switch. In response to an FA zoom start instruction via the FA zoom operation switch, the FA zoom control unit 122 stores each zoom position of the electronic zoom and the optical zoom in the memory 118. Further, the FA zoom control unit 122 instructs the CZ control unit 119 or the electronic zoom control unit 120 to zoom out toward the wide angle direction according to a processing procedure described below. Thus, the camera is brought into a subject search state in which the angle of view is zoomed out compared to that in the shooting preparation state.

Figure 3A:
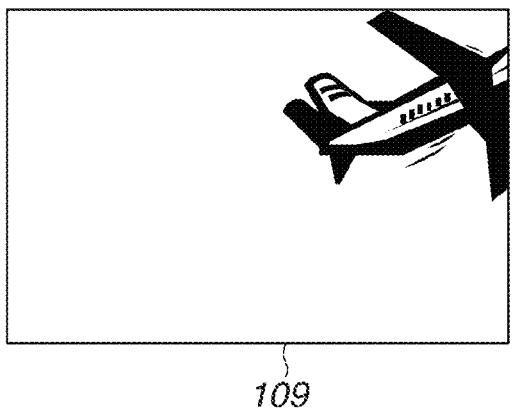
FIGS. 3A, 3B, 3C, and 3D illustrate examples of the angle of view in a subject search state and the angle of view in a shooting preparation state.

Subsequently, examples of the angle of view in the shooting preparation state and the subject search state are described in detail below with reference to FIGS. 3A, 3B, 3C, and 3D. Each of FIGS. 3A and 3D illustrates the angle of view in a zoom-in state (i.e., in the shooting preparation state). Each of FIGS. 3B and 3C illustrates the angle of view in a zoom-out state (i.e., in the subject search state).

When a subject is going out of the frame as illustrated in FIG. 3A, the photographer can press the FA zoom operation switch to search for the subject. A zoom-out state can be maintained while the FA zoom operation switch is pressed. An FA zoom frame 300 indicating the zoom-in position is superimposed on the image displayed on the display unit 109 (see FIG. 3B).

Figure 3B:
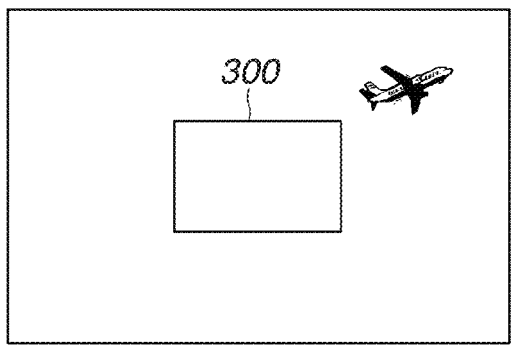
Figure 3C:
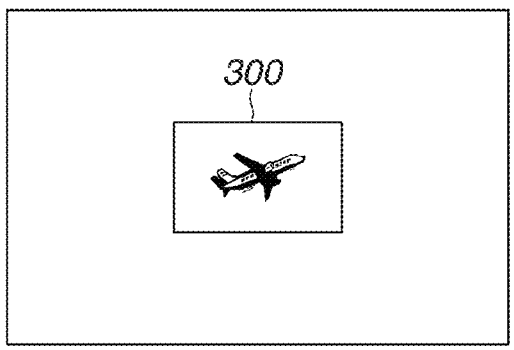
Figure 3D:
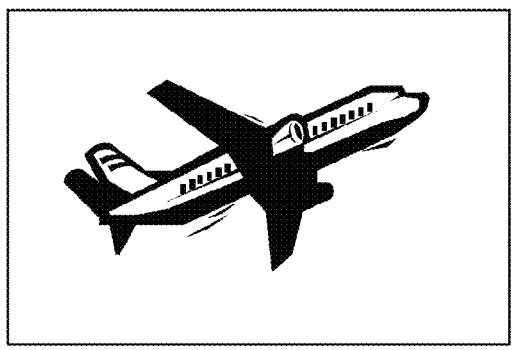

If the photographer finds an intended subject in the zoom-out state (i.e., the subject search state) illustrated in FIG. 3B, the photographer performs a framing operation in such a way as to locate the subject in the FA zoom frame 300 as illustrated in FIG. 3C. Subsequently, the photographer instructs the FA zoom control unit 122 to terminate the FA zoom operation by releasing the FA zoom operation switch. In this case, the FA zoom control unit 122 performs the zoom-in operation according to the electronic zoom or the optical zoom to reach the zoom position (i.e., the zoom-in position) of the stored shooting preparation state. Thus, an optimum framing state can be obtained as illustrated in FIG. 3D.

The FA zoom frame control unit 121 calculates a size that indicates the angle of view in the stored shooting preparation state and causes the display unit 109 to display the FA zoom frame 300 at the center of the EVF, as illustrated in FIGS. 3B and 3C. The size of the FA zoom frame 300 can be calculated based on a zoom magnification in the zoom-out state. For example, if a zoom-out operation is performed at an electronic zoom magnification of 2 times and an optical zoom magnification of 3 times to bring the camera into the subject search state from the shooting preparation state, an FA zoom frame having a size of ⅙ (=(½)×(⅓)) times the angle of view to be displayed on the EVF in the subject search state is displayed. Through the above-mentioned processing, the photographer can move the subject from the frame-out position to a frame-in position again with a simple operation so that an image of the subject can be captured at a desired angle of view.

Further, when the subject to be captured is moving, the subject tends to go out of the frame. When a photographer captures an image of such a scene, the automatic tracking mode of the camera is available so that the camera can automatically change the zoom position so as to prevent the subject from going out of the frame. In particular, the angle of view is narrow when a shooting operation is performed in the telephoto state. Therefore, the subject easily may go out of the frame when the camera causes a tiny movement due to a camera shake.

The digital camera 100 according to the present exemplary embodiment is operable in the automatic tracking mode of the FA zoom function. In the automatic tracking mode, the photographer can point a desired portion on a touch panel to designate a subject to be captured. The subject designation method is not limited to the above-mentioned touch panel operation. For example, according to another designation method, the photographer can press a specific button when a subject is positioned around the center. Further, according to another designation method, the camera can be configured to automatically select a main subject from a plurality of objects having been detected.

The subject detection unit 123 calculates, on the image data, the position and the size of the subject area designated from the image memory 108. When the subject detection unit 123 continuously performs the above-mentioned operation on image data to be sampled when a live view is displayed, it becomes feasible to track the movement of the subject. When the subject to be followed up is detected in a zoom-out area ZO (first area), which is described in detail below, or when the size of the subject becomes greater than a predetermined size (see FIG. 3A), the FA zoom control unit 122 instructs the CZ control unit 119 or the electronic zoom control unit 120 to zoom out toward the wide angle direction (see FIG. 3B). When the subject is detected in a zoom-in area ZI (second area) of the FA zoom frame 300, which is described in detail below, and when the subject is completely positioned within a range of a predetermined size (see FIG. 3C), the FA zoom control unit 122 performs a zoom-in operation to reach the zoom position in a telephoto direction indicated by the FA zoom frame 300 (see FIG. 3D). Through the above-mentioned processing, the photographer can move the camera in such a way as to place the subject within the screen without considering the zoom operation. If the subject almost goes out of the frame, the zoom position can be automatically changed. Therefore, it becomes feasible to easily adjust the angle of view. The system according to the present exemplary embodiment can perform the zoom-out operation and the zoom-in operation at optimum timing in the above-mentioned automatic tracking mode. Therefore, it becomes feasible for the photographer to easily perform the framing operation.

Figure 4A:
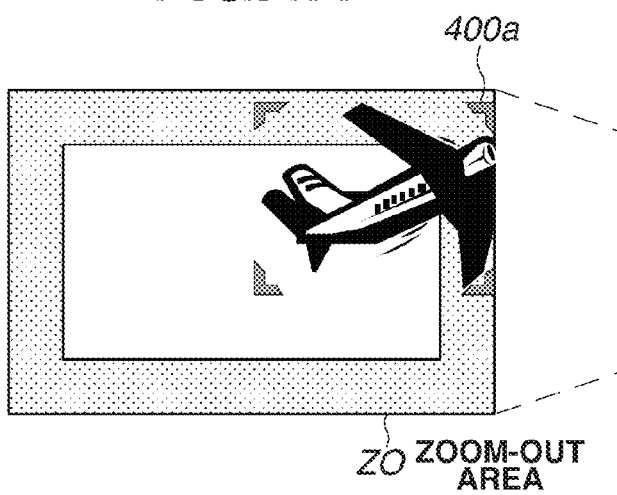
FIGS. 4A and 4B illustrate frame-out prevention processing that can be performed by the camera to prevent a subject (nonhuman object) from going out of the screen.
Figure 4B:
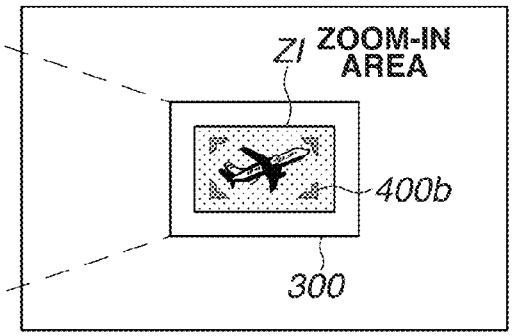

Next, conditions to start the zoom-out operation and the zoom-in operation are described in detail below with reference to FIGS. 4A and 4B through FIGS. 6A, 6B, and 6C. FIGS. 4A and 4B illustrate an example of the frame-out prevention processing that can be performed by the camera to prevent a subject (nonhuman object) from going out of the screen. FIGS. 5A, 5B, 5C, and 5D illustrate another example of the frame-out prevention processing that can be performed by the camera to prevent a subject (human object) from going out of the screen.

FIGS. 4A and 4B illustrate nonhuman object tracking frames 400a and 400b each following up a subject (nonhuman object). FIGS. 5A, 5B, 5C, and 5D each illustrate a face tracking frame 500 that follows up a subject (human face). In the present exemplary embodiment, in a case where the subject is applicable to each of a human object and a nonhuman object, the nonhuman object tracking frame 400 and the face tracking frame 500 can be collectively referred to as a subject tracking frame. The display unit 109 displays the subject tracking frame on the EVF in such a way as to surround the subject, so that the subject designated by the photographer can be recognized. The position and the size of the subject tracking frame on the screen can be calculated by the subject detection unit 123 based on face information and color information and updated at frame rate intervals.

FIGS. 4A and 4B illustrate frame-out prevention processing to prevent an airplane (i.e., a subject) from going out of the screen. FIG. 4A illustrates the zoom-out area ZO that is an external area that corresponds to a predetermined rate of the whole angle of view (i.e., the entire screen) displayed on the EVF. For example, when the center point of the screen is 0% and the entire screen is 100%, the boundary of the zoom-out area ZO is set at a position that corresponds to 80% of the entire screen, and an area ranging from 80% to 100% of the entire screen is defined as the zoom-out area ZO. If a part of the nonhuman object tracking frame 400a enters or is located in the zoom-out area ZO of the image, the camera starts the zoom-out operation. Further, the camera stores in the memory 118 information about the zoom position before starting the zoom-out operation (movement). The zoom magnification and the zoom speed in the zoom-out operation are set beforehand according to the size and the moving speed of the subject. Alternatively, the zoom magnification and the zoom speed can be appropriately calculated according the size and the moving speed of the subject. The system performs the zoom-out operation according to the magnification and the zoom speed. Therefore, the camera can effectively prevent the subject from going out of the frame.

FIG. 4B illustrates the angle of view obtained when a zoom-out operation has been performed by a predetermined zoom driving amount from the angle of view illustrated in FIG. 4A. FIG. 4B illustrates the zoom-in area ZI that is an internal area that corresponds to a predetermined rate of the zoom-in angle of view indicated by the FA zoom frame 300 in the subject search state. For example, when the center point of the screen is 0% and the zoom-in angle of view indicated by the FA zoom frame 300 is 100%, the boundary of the zoom-in area ZI is set at a position that corresponds to 70% of the zoom-in angle of view, and an area ranging from 0% to 70% of the entire region of the FA zoom frame 300 is defined as the zoom-in area ZI. In this case, for example, if the zoom-out magnification is ½ times, the size of the FA zoom frame 300 is comparable to 50% of the entire screen. Accordingly, the zoom-in area ZI is an area corresponding to 0 to 35% (=70%×(½)) of the entire screen. If a photographer changes the direction of the camera in such a way as to accommodate the nonhuman object tracking frame 400b in the zoom-in area ZI, the zoom-in operation can be started.

Hereinafter, a relationship between a lower-limit rate (80% according to the above-mentioned example) of the zoom-out area ZO and an upper-limit rate (70% according to the above-mentioned example) of the zoom-in area ZI is described below. It is now assumed that the camera performs a zoom-out operation when the nonhuman object tracking frame 400 is detected at a position adjacent to a ZO lower-limit rate in the shooting preparation state. Further, it is assumed that the subject stops at the above-mentioned position, and the direction of the camera itself has not been changed. In this case, if the ZO lower-limit rate is set to be similar to the ZI upper-limit rate, the nonhuman object tracking frame 400 is almost placed in the zoom-in area ZI immediately after the zoom-out operation is completed. Further, if the ZO lower-limit rate is set to be smaller than the ZI upper-limit rate, the nonhuman object tracking frame 400 is completely placed in the zoom-in area ZI immediately after the zoom-out operation is completed, and the camera immediately starts a zoom-in operation. More specifically, a hunting phenomenon repeating the zoom-out operation and the zoom-in operation occurs. Accordingly, to prevent the hunting phenomenon, it is necessary to set the relationship between the ZO lower-limit rate and the ZI upper-limit rate so as to satisfy ZO lower-limit rate >ZI upper-limit rate.

FIGS. 5A, 5B, 5C, and 5D illustrate frame-out prevention processing that can be performed by the camera to prevent a human object (i.e., a subject) from going out of the screen. In a case where the subject is a human object, the camera starts a zoom-out operation when a part of the face tracking frame 500 enters or is within the zoom-out area ZO and performs a zoom-in operation when the face tracking frame 500 is placed in the zoom-in area ZI. The case in which the subject is a human object is different from the case in which the subject is a nonhuman object, in the following point. When the subject is a human object, the moving direction of the subject can be predicted to a certain extent. Therefore, considering the predicted moving direction, the camera can set the zoom-out area ZO and the zoom-in area ZI.

Further, when a photographer performs a shooting operation while holding the camera in a hand, there is a possibility that the subject target goes out of the frame due to influence of camera shake. In this case, it is now presumed that the zoom-out area ZO is set in the peripheral region of the screen as illustrated in FIG. 4A, to capture an image of a human in a handheld state. When the photographer performs a shooting operation in a state where the human is placed around the center of the image, there is a possibility that the face tracking frame enters the zoom-out area ZO due to camera shake and zooms out unintendedly. In particular, when the imaging object is a human object, there is a higher possibility that the face tracking frame is positioned in an upper part of the screen. Therefore, there is a higher possibility that the face tracking frame enters the zoom-out area ZO positioned at an upper part of the screen. On the other hand, even when the subject goes out of the frame due to camera shake, the photographer can recapture or track the subject again by performing a framing operation while holding the camera in a hand. Therefore, in a case where the subject is a human object and the camera is in the handheld state, the setting of the zoom-out area ZO in the upper part of the screen is restricted considering the framing operation that may be performed by the photographer. In this case, there is a higher possibility that a human body is included in the lower part of the screen. In other words, there is a lower possibility that the face area enters the lower part of the screen. Therefore, the setting of the zoom-out area ZO is restricted to prevent the zoom-out operation from being performed unnecessarily.

Figure 5A:
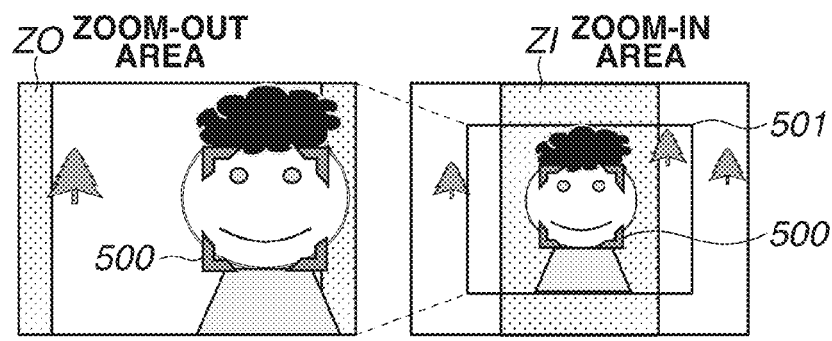
FIGS. 5A, 5B, 5C, and 5D illustrate frame-out prevention processing that can be performed by the camera to prevent a subject (human object) from going out of the screen.
Figure 13A:
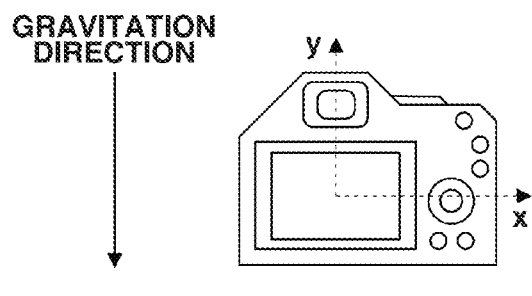
FIGS. 13A, 13B, 13C, 13D, 13E, and 13F illustrate the axis direction of an acceleration sensor in respective orientations.
Figure 13B:
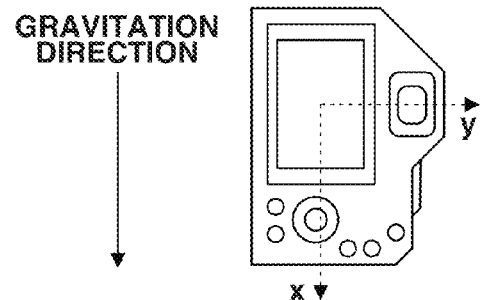
Figure 13C:
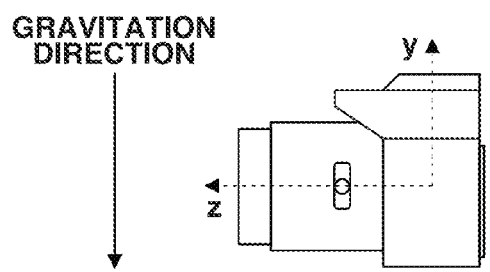

FIG. 5A illustrates the zoom-out area ZO and the zoom-in area ZI that can be set when the camera is regularly positioned in a handheld state (see FIGS. 13A and 13C). When a photographer captures an image of a far target positioned at substantially the same height as the photographer, the direction of the camera is kept in the horizontal direction. In this case, the state detected by the orientation detection unit 124 and the shake detection unit 125 is "regularly positioned/horizontally directed/handheld". In the above-mentioned shooting scene, the subject tends to move in the horizontal direction and go out of the frame. More specifically, there is a higher possibility that the subject position moves in the horizontal direction (i.e., the right-and-left direction, in other words "longitudinal direction") of the screen when the screen is regularly positioned. Therefore, as illustrated in FIG. 5A, the camera sets the zoom-out area ZO and the zoom-in area ZI in pale in the vertical direction (i.e., the up-and-down direction, in other words "short-length direction") relative to the regularly positioned screen. Then, if the face tracking frame 500 enters or is within the zoom-out area ZO, the camera determines to start a zoom-out operation and performs the zoom-out operation by a predetermined zoom magnification. Further, if the face tracking frame 500 is included in the zoom-in area ZI in the zoom-out state, the camera determines to start a zoom-in operation and performs the zoom-in operation by a predetermined zoom magnification to reach a zoom return position 501. By setting the zoom-out area ZO and the zoom-in area ZI as mentioned above, the camera can effectively prevent the subject from going out of the frame.

Figure 5B:
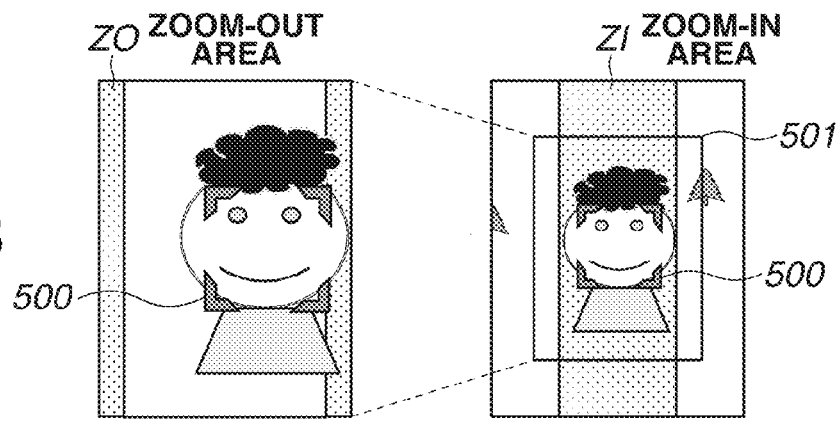

FIG. 5B illustrates the zoom-out area ZO and the zoom-in area ZI that can be set when the camera is vertically positioned in a grip-down or grip-up state (see FIGS. 13B and 13E), in the similar shooting scene. In this case, the state detected by the orientation detection unit 124 and the shake detection unit 125 is "vertically positioned/horizontally directed/handheld". Even in FIG. 5B, similar to FIG. 5A, the possibility that the subject moves in the horizontal direction (i.e., the right-and-left direction, in other words, "short-length direction") is taken into consideration in the setting of the zoom-out area ZO and the zoom-in area ZI. In this case, the camera sets the zoom-out area ZO and the zoom-in area ZI in pale in the vertical direction (i.e., the up-and-down direction, in other words, "longitudinal direction") relative to the vertically positioned screen. The camera can detect a movement of the subject in the horizontal direction and can effectively prevent the subject from going out of the frame.

Figure 5C:
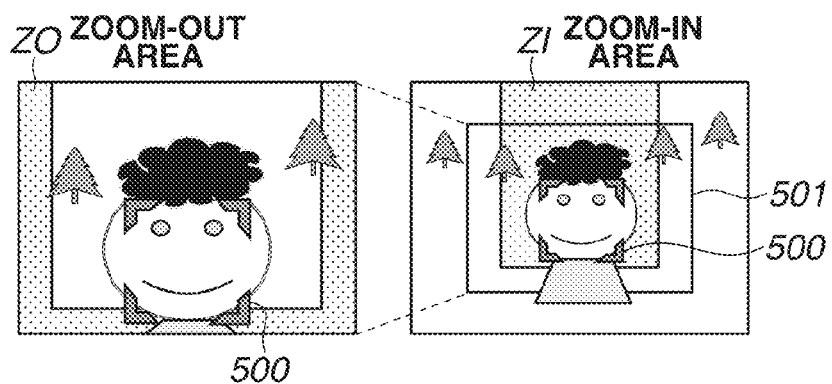
Figure 13D:
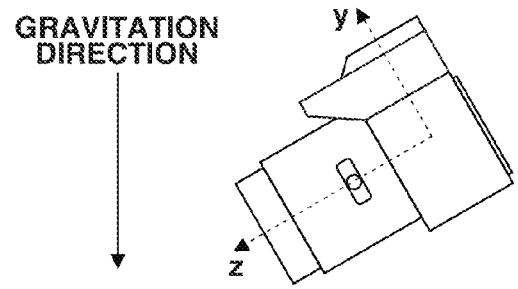
Figure 13E:
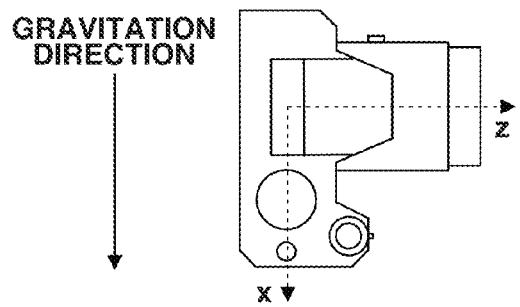
Figure 13F:
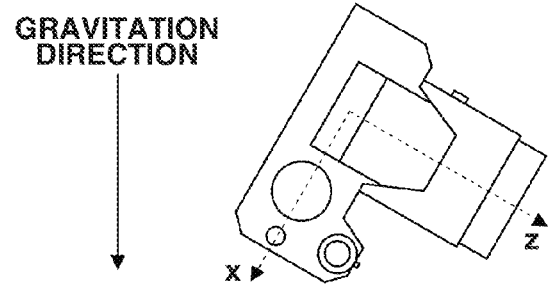

FIG. 5C illustrates the zoom-out area ZO and the zoom-in area ZI that can be set when the state detected by the orientation detection unit 124 and the shake detection unit 125 is "regularly positioned/downwardly directed/handheld" (see FIG. 13D). The shooting scene illustrated in FIG. 5C presumes a situation in which a tiny subject (e.g., a child) smaller than the photographer is approaching toward the camera. In this case, there is a possibility that the subject moves in the downward direction of the screen and goes out of the frame. Therefore, the camera sets a zoom-out area ZO in the lower part of the regularly positioned screen. Further, the camera does not set a zoom-in area ZI after completing the zoom-out operation in the lower part of the regularly positioned screen.

Figure 5D:
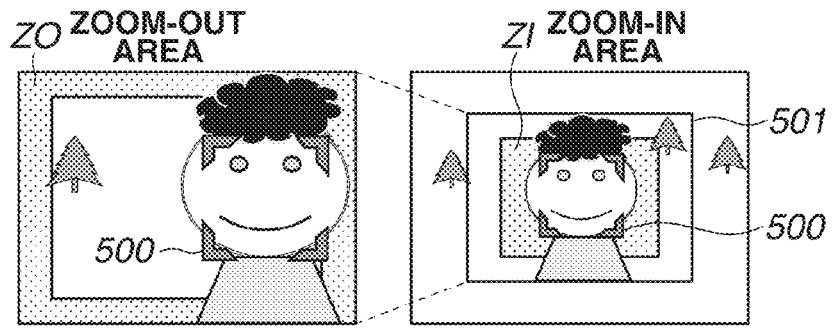

FIG. 5D illustrates the zoom-out area ZO and the zoom-in area ZI that can be set when the state detected by the orientation detection unit 124 and the shake detection unit 125 is "regularly positioned/horizontally directed/fixed". In a case where the camera is fixed on a tripod, there is no possibility that the subject goes out of the frame due to camera shake. Further, if a zoom-in operation is performed in a state where the subject does not yet reach a frame-in position around the center of the screen, the zoom-in operation may cause the subject to go out of the frame. The photographer cannot perform a framing operation for re-framing. Accordingly, the zoom-out area ZO is set in the entire peripheral region of the screen and the zoom-in area ZI is set inside the zoom-in angle of view 501. Therefore, a zoom-out operation can be started easily. On the other hand, the zoom-in operation start condition is set to be strict.

As mentioned above, the camera according to the present exemplary embodiment can dynamically change the zoom-out area ZO and the zoom-in area ZI according to a change in both the camera orientation and the shooting state (e.g., handheld state/fixed state) so as to prevent the subject from going out of the frame while preventing an erroneous operation that may occur due to camera shake. Alternatively, the camera may change the zoom-out area ZO and the zoom-in area ZI according to either the camera orientation or the shooting state (handheld state/fixed state). Further, the camera may change only one of the zoom-out area ZO and the zoom-in area ZI.

According to the examples illustrated in FIGS. 5A, 5B, 5C, and 5D, the camera does not set the zoom-out area ZO and the zoom-in area ZI in the direction in which the start of the zoom-out or the start of the zoom-in is not detected. However, the present invention is not limited to the above-mentioned examples. For example, it can be configured to change the setting rate differently in each direction in such a way as to set the size of the area to be 10% of the entire screen in the longitudinal direction and to be 20% in the short-length direction.

FIG. 14 illustrates setting combinations of the zoom-out area ZO and the zoom-in area ZI (including ZO/ZI area basic setting, occupation rate of ZO area in horizontal direction of the screen, and occupation rate of ZI area in horizontal direction of screen) that correspond to detection results obtained by the subject detection unit 123, the orientation detection unit 124, and the shake detection unit 125.

When the detection result obtained by the shake detection unit 125 is "fixed" or when the subject is a nonhuman object, the camera performs settings in such a way as to equalize a longitudinal rate with a short-length rate. The longitudinal rate is an occupation rate of pixels that constitute the ZO area in the longitudinal direction of the screen. The short-length rate is an occupation rate of pixels that constitute the ZO area in the short-length direction of the screen. Further, the camera performs settings in such a way as to equalize an upper part rate with a lower part rate. The upper part rate is an occupation rate of pixels that constitute the ZO area in the upper part of the screen and the lower part rate is an occupation rate of pixels that constitute the ZO area in the lower part of the screen, in the horizontal direction of the screen (i.e., the right-and-left direction) in the detected orientation. The settings to be performed for the ZI area are similar to the above-mentioned settings for the ZO area.

On the other hand, when the subject is a human object and the detection result obtained by the shake detection unit 125 is "handheld", the camera sets the ZO area and the ZI area according to the detection result obtained by the orientation detection unit 124. For example, if the detection result obtained by the orientation detection unit 124 is "regularly positioned", the camera determines the ZO area and the ZI area so as to set the longitudinal rate to be smaller than the short-length rate. The setting to be performed in this case is referred to as "basic setting". If the detection result obtained by the orientation detection unit 124 is "vertically positioned", the camera determines the ZO area and the ZI area in such a way as to set the longitudinal rate to be greater than the short-length rate. Further, if the direction of the digital camera 100 detected by the orientation detection unit 124 is "horizontally directed", the camera sets the ZO area and the ZI area in such a way as to equalize the upper part rate with the lower part rate. On the other hand, if the direction of the digital camera 100 detected by the orientation detection unit 124 is "downwardly directed" or "upwardly directed", the camera determines the ZO area in such a way as to set the rate of the forward direction of the digital camera 100 (e.g., the lower part rate if the detected direction is the downward direction) to be greater, compared to the basic setting. Further, when the direction of the digital camera 100 is "downwardly directed" or "upwardly directed", the camera determines the ZI area so as to set the rate of the forward direction of the digital camera 100 (e.g., the lower part rate if the detected direction is the downward direction) to be smaller.

Figures 6A, 6B, 6C:
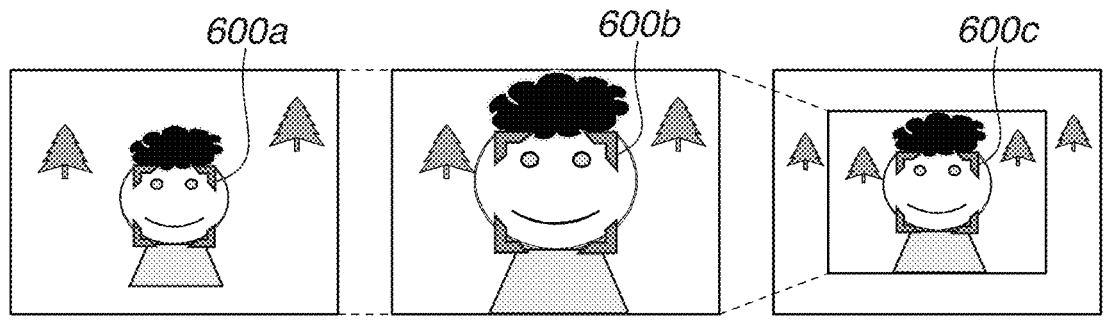
FIGS. 6A, 6B, and 6C illustrate size change prevention processing that can be performed by the camera to prevent a subject (human object) from changing the size in the screen.

Next, a method for controlling the zoom operation according to the size of a subject is described in detail below. FIGS. 6A through 6C illustrate an example of the zoom operation that can be performed by the camera so as to automatically suppress the occupation rate of a subject in the screen within a predetermined rate when a human object (i.e., a subject) is approaching the camera. The camera displays face tracking frames 600a to 600c in such a way as to surround a face area (i.e., a characteristic area) of the human object (i.e., the subject). Accordingly, in the following description, it is presumed that the respective sizes of the face tracking frames 600a to 600c are comparable to the size of the subject.

FIG. 6A illustrates an angle of view when the subject is designated according to a subject designation method described in detail below. The size of the face tracking frame 600a at the subject designation timing is stored as a standard subject size (i.e. a standard size) in the memory 118.

FIG. 6B illustrates an angle of view when a subject is approaching the camera in a state where the zoom position is not changed compared to the state illustrated in FIG. 6A. For example, the camera sets a start size of the zoom-out operation, which is comparable to 150% of the size of the face tracking frame 600a (i.e., the standard subject size). If the subject tracking frames (i.e., the face tracking frames) satisfies the relationship "face tracking frame 600b>face tracking frame 600a×150%" (if a change exceeding a predetermined change amount occurs in relation to the standard size), the FA zoom control unit 122 determines to start the zoom-out operation.

FIG. 6C illustrates an angle of view that has zoomed out by a predetermined zoom magnification from the angle of view illustrated in FIG. 6B together with the face tracking frame 600c. In the present exemplary embodiment, the predetermined zoom magnification is set to be 1/1.5 times considering the change amount (150%) of the face tracking frame size from the standard subject size when the zoom-out operation is started. If the subject is further approaching the camera, the camera causes the zoom position to zoom out toward the wide angle direction so as to constantly suppress the size of the subject within a predetermined rate. Therefore, the photographer can concentrate on the operation of the release switch.

Figure 15A:
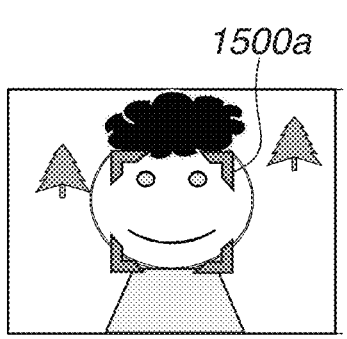
FIGS. 15A, 15B, and 15C illustrate processing that can be performed by the camera to prevent a subject (human object) from being partly cut off in a shooting operation.
Figure 15B:
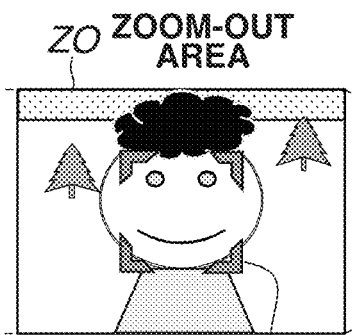
Figure 15C:
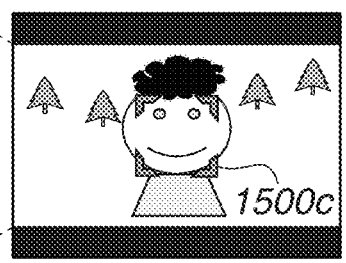

FIGS. 15A, 15B, and 15C illustrate example image capturing processing that can be performed by the camera to prevent a part (e.g., a head) of a human object (i.e., a subject) from being cut when the aspect ratio of the screen is changed.

FIG. 15A illustrates the angle of view when the subject is designated according to a subject designation method described in detail below. The size of a face tracking frame 1500a at the subject designation timing is stored as a standard subject size (i.e., a standard size) in the memory 118. Further, the aspect ratio of the screen illustrated in FIG. 15A is 4:3.

FIG. 15B illustrates the zoom-out area ZO having been set in the upper part of the screen when the aspect ratio of the screen is changed from 4:3 to 16:9. To realize a shooting operation at an aspect ratio of 16:9 when the aspect ratio of the entire screen of the display unit 109 is 4:3, the recording in the upper part and the lower part of the screen is restricted to realize a desired aspect ratio. The above-mentioned recording restricted area is referred to as "unrecorded area".

When a part of the subject is positioned in the unrecorded area in a state where the aspect ratio of the screen is 4:3, if a still image is captured immediately after the aspect ratio is changed to 16:9, the part of the subject will be removed from the captured image. Further, it is now presumed that the aspect ratio is set to 4:3 in a shooting standby state for a still image or a moving image and is set to 16:9 in a moving image recording operation. If the camera starts recording a moving image in a state where a part of the subject is positioned in the unrecorded area in the shooting standby state, the part of the subject will be removed off the captured moving image immediately after starting the recording. In particular, if the subject is a human object, it is usual that a human head is positioned in the upper part of the screen. Therefore, there is a higher possibility that a captured still (or moving) image does not include the head.

In view of the foregoing, the camera according to the present exemplary embodiment sets the zoom-out area ZO in such a way as to include the unrecorded area positioned in the upper part of the screen, immediately before the aspect ratio is changed. Therefore, the subject (i.e., the human) can be recaptured in the screen by performing a zoom-out operation with a predetermined zoom magnification when the human head enters the zoom-out area ZO.

A human head area detection method is described in detail below. It is feasible to estimate the human head area based on the position and size of a face tracking frame 1500*b*. For example, Yt represents a Y coordinate value of a parietal region of the human in the vertical direction, Yc represents a Y coordinate value of the center of the face tracking frame 1500*b*, and S represents a size of the tracking frame 1500*b*. If the position of the parietal region is offset upward from the center of the face tracking frame 1500*b* by an amount corresponding to n times the size of the face tracking frame 1500*b*, the Y coordinate value of the parietal region can be expressed using a formula $Yt=Yc+n\times S$. If it is determined that the above-mentioned coordinate value is positioned in the zoom-out area ZO immediately before the aspect ratio is changed, the camera starts a zoom-out operation.

FIG. 15C illustrates an angle of view that has zoomed out from the angle of view illustrated in FIG. 15B by a predetermined zoom magnification when the aspect ratio of the screen is changed to 16:9. The above-mentioned predetermined zoom magnification can be calculated based on a change rate of the length in the length varying direction before and after the aspect ratio is changed. For example, if the entire screen of the display unit 109 has the VGA size, the screen size is 640×480 when the aspect ratio is 4:3 and 640×360 when the aspect ratio is 16:9. Further, the length varying direction in the case where the aspect ratio is changed from 4:3 to 16:9 is the vertical direction. In this case, the above-mentioned predetermined zoom magnification is 0.75 (=360/480), which is the change rate of the length in the vertical direction before and after the aspect ratio is changed. Thus, the occupation rate of the subject in the vertical direction of the screen can be maintained at the same level. Further, the standard subject size stored in the memory 118 in FIG. 15A is set to 0.75 times so as to prevent the angle of view from being returned to the original state when the processing illustrated in FIGS. 6A, 6B, and 6C is performed to suppress the rate of the subject within a predetermined rate.

The frame-out prevention processing, which is applicable when the subject is a nonhuman object or a human object, has been described with reference to FIGS. 4A and 4B and FIGS. 5A, 5B, 5C, and 5D. Further, the processing for suppressing the size of the subject within a predetermined rate, which is applicable when the subject is a human object, has been described with reference to FIGS. 6A, 6B, and 6C. Even in a case where the subject to be followed up is a nonhuman object, the camera may perform the zoom operation start determination processing illustrated in FIGS. 6A, 6B, and 6C for the subject size holding control, similar to the case where the subject is a human object.

Further, the processing for preventing a part of the subject from being removed from a captured image when the aspect ratio of the screen is changed has been described with reference to FIGS. 15A, 15B, and 15C. The combination of the pre-change/post-change aspect ratios and the orientation of the camera are not limited to the above-mentioned examples. Further, the setting area of the zoom-out area ZO is not limited to the upper part of the screen. For example, the zoom-out area ZO can be set in such a way as to include a lower part or a side part of the screen to prevent a leg or a shoulder from being removed off. Even in a case where the subject to be followed up is a nonhuman object, the camera can perform the processing illustrated in FIG. 15, similar to the case where the subject is a human object.

Figure 7:
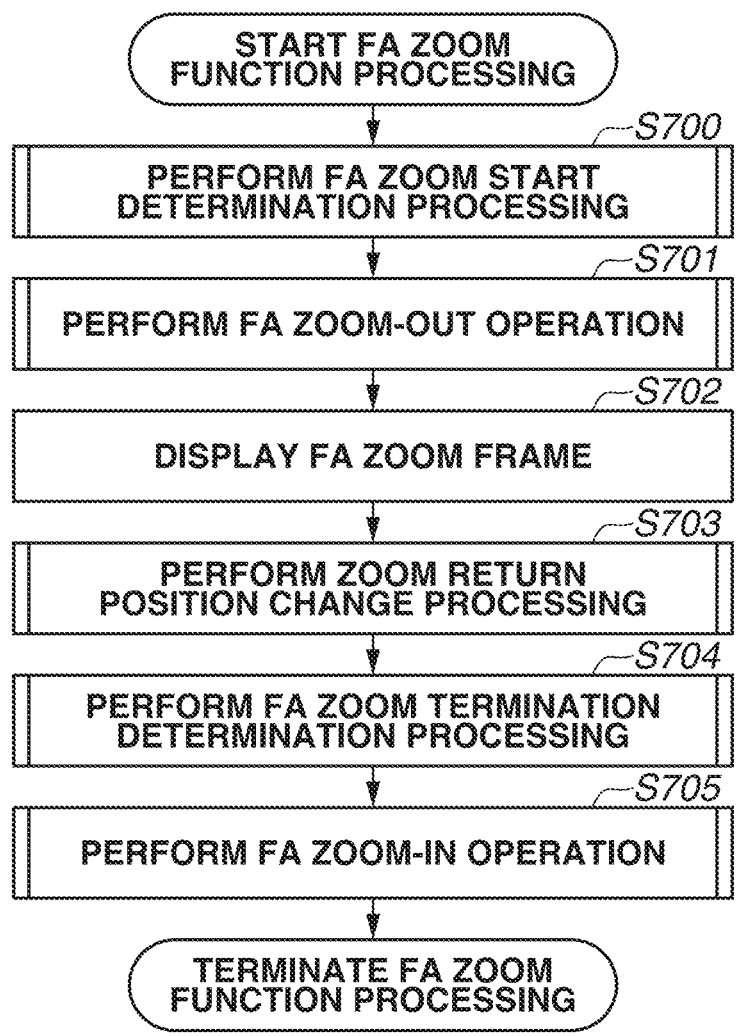
FIG. 7 is a flowchart schematically illustrating a processing flow of an FA zoom function processing that can be performed by the camera.

Next, FA zoom function processing is schematically described below with reference to FIG. 7. FIG. 7 is a flowchart illustrating a general flow of the FA zoom function processing. Unless otherwise specifically mentioned, the FA zoom function processing illustrated in FIG. 7 is performed based on commands of the FA zoom control unit 122.

In step S700, the FA zoom control unit 122 performs FA zoom start determination processing to determine whether to start an FA zoom operation. The FA zoom start determination processing includes determining a mode to be selected between the manual search mode and the automatic tracking mode. The FA zoom control unit 122 determines whether to start the FA zoom operation based on a state of the FA zoom operation switch of the operation unit 117 if the selected mode is the manual search mode or based on a subject detection result if the selected mode is the automatic tracking mode. A mode determination method is described in detail below. If the start of the FA zoom operation is determined in the FA zoom start determination processing in step S700, the operation proceeds to step S701.

In step S701, the FA zoom control unit 122 stores an optical zoom position and an electronic zoom position at zoom-out start timing, and sends a predetermined driving amount to the CZ control unit 119 or the electronic zoom control unit 120 to perform an FA zoom-out operation. When the FA zoom-out operation terminates, the operation proceeds to step S702. In step S702, the FA zoom frame control unit 121 causes the display unit 109 to display the FA zoom frame 300 indicating the stored zoom position. A photographer performs the framing operation so as to locate a subject to be captured around the center of the screen with reference to the FA zoom frame 300. In this case, if the subject cannot be positioned within the FA zoom frame 300 or if the subject is too small, then in step S703, the FA zoom frame control unit 121 changes the FA zoom frame 300 to have an appropriate size, and updates the information about the stored zoom position. In step S704, the FA zoom control unit 122 determines whether to terminate the FA zoom operation.

The FA zoom control unit 122 perform FA zoom termination determination processing based on the state of the FA zoom operation switch of the operation unit 117 if the mode at the FA zoom start timing is the manual search mode, or based on a subject detection result if the selected mode is the automatic tracking mode. If the termination of the FA zoom operation is determined in the FA zoom termination determination processing in step S704, the operation proceeds to step S705. In step S705, the FA zoom control unit 122 performs a zoom-in operation by causing the CZ control unit 119 or the electronic zoom control unit 120 to drive the zoom mechanism so as to reach the stored optical zoom position and the electronic zoom position. Then, the FA zoom control unit 122 terminates the FA zoom function processing illustrated in FIG. 7.

Next, processing to be performed according to the flow of the FA zoom function processing illustrated in FIG. 7 is described in detail below with reference to FIGS. 8 through 12.

FIG. 8 is a flowchart illustrating the FA zoom start determination processing to be performed in step S700 illustrated in FIG. 7. In step S800, the FA zoom control unit 122 determines whether the FA zoom operation switch of the operation unit 117 has been pressed. If it is determined that the FA zoom operation switch has been pressed (YES in step S800), the operation proceeds to step S801 to measure a pressing time (i.e., an operation time) of the switch.

In step S801, the FA zoom control unit 122 determines whether the FA zoom operation switch has been released within a predetermined time since the pressing start timing of the FA zoom operation switch. More specifically, the FA zoom control unit 122 determines whether the switch has been pressed for a long time or for a short time. The FA zoom control unit 122 changes the mode to be selected according to the pressing time. If it is determined that the FA zoom operation switch has been pressed for a long time (NO in step S801), the operation proceeds to step S802 to select the manual search mode. If it is determined that the FA zoom operation switch has been pressed for a short time (YES in step S801), the operation proceeds to step S803 to select the automatic tracking mode. The FA zoom control unit 122 stores the selected mode in the memory 118. If the selected mode is the manual search mode, the operation proceeds to step S808 when a predetermined time has elapsed since the pressing start timing of the switch in a state where the switch is continuously pressed. In other words, the FA zoom control unit 122 determines to start the FA zoom operation upon confirming the long-time pressing state of the switch. If the selected mode is the automatic tracking mode, the operation proceeds to step S804. In step S804, the FA zoom control unit 122 performs subject designation processing to designate a subject to be followed up.

As mentioned above, in the present exemplary embodiment, the FA zoom control unit 122 selects either the manual search mode or the automatic tracking mode based on the pressing time of the switch. However, any other appropriate method using the zoom operation switch is employable as the mode determination method. For example, it may be useful to identify a designated mode if the zoom operation switch is once pressed and pressed again within a predetermined period of time. Further, it may be useful to identify a designated mode if the zoom operation switch and another member are simultaneously operated. Further, the zoom operation switch is not limited to the pressing type. For example, a rotatable ring member is usable to allow a photographer to instruct an FA zoom operation.

Figure 9C:
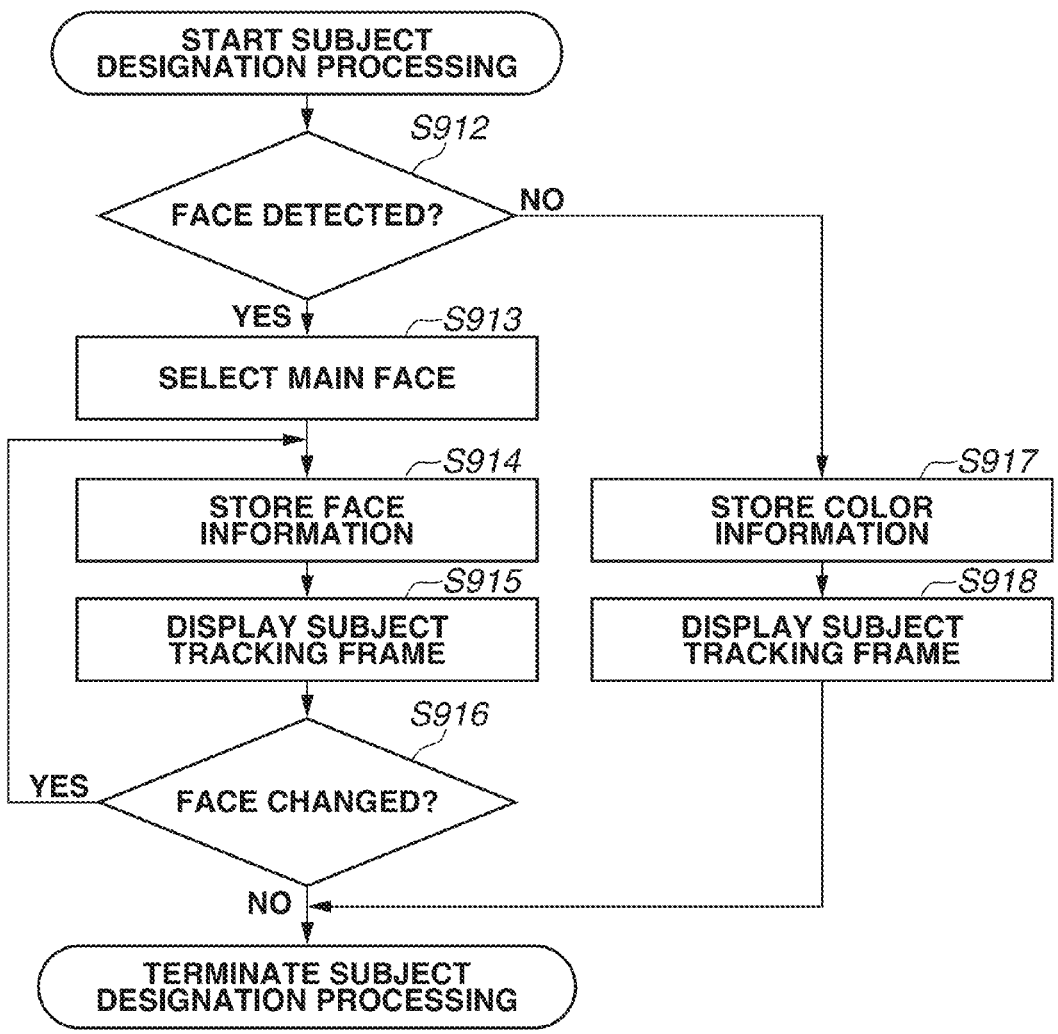

The subject designation processing to be performed in step S804 illustrated in FIG. 8 is described in detail below with reference to FIGS. 9A, 9B, and 9C. FIG. 9A is a flowchart illustrating an example of the designation processing that can be performed by touching a subject displayed on the display unit 109 when the touch panel (i.e., a member of the operation unit 117) is usable. In step S900, the FA zoom control unit 122 determines whether the touch panel has been pressed. If it is determined that the touch panel has been pressed (YES in step S900), the operation proceeds to step S901. The FA zoom control unit 122 acquires information about the touched position.

In step S902, the FA zoom control unit 122 notifies the subject detection unit 123 of the touch position. The subject detection unit 123 performs face detection processing on image data around the touch position. If it is determined that a face has been detected around the touch position (YES in step S902), the subject detection unit 123 determines that the main subject is a human object, and the operation proceeds to step S903. In step S903, the subject detection unit 123 stores the acquired human face information (i.e., automatic tracking target) in the memory 118. For example, the face information includes face size (at subject designation timing), face detection position, and face direction. Further, when the camera has a face authentication function, the subject detection unit 123 stores authentication ID as a part of the face direction.

If no face has been detected around the touch position (NO in step S902), the subject detection unit 123 determines that the main subject is a nonhuman object, and the operation proceeds to step S904. In step S904, the subject detection unit 123 stores a characteristic color around the touch position as color information about the automatic tracking target in the memory 118. For example, the color information includes characteristic color attribute values (e.g., color, luminance, and color difference) at the subject designation timing as well as and information (e.g., size and centroid position) about the same color area. The above-mentioned face information and the color information are collectively referred to as subject information (subject size/subject detection position).

After the subject detection unit 123 completes the storage of the subject information in step S903 or step S904, the operation proceeds to step S905. In step S905, the subject detection unit 123 causes the display unit 109 to display a subject tracking frame (i.e., the nonhuman object tracking frame 400 or the face tracking frame 500) having a size corresponding to the subject size around the center of the subject detection position. Then, the subject detection unit 123 terminates the subject designation processing illustrated in FIG. 9A. When the above-mentioned method described with reference to the flowchart illustrated in FIG. 9A is employed, each photographer can easily designate a subject to be followed up in an intuitive manner.

On the other hand, FIG. 9B is a flowchart illustrating an example of the designation processing that can be performed by using a switch other than the FA zoom operation switch (i.e., a member of the operation unit 117) to designate a subject. In step S906, the FA zoom control unit 122 causes the display unit 109 to display a subject designation reference frame around the center of the screen. A photographer adjusts the direction of the camera in such a way as to place the subject to be followed up around the center of the reference frame. In step S907, the FA zoom control unit 122 determines whether a subject designation switch has been pressed. If it is determined that the subject designation switch has been pressed (YES in S907), the operation proceeds to step S908.

In step S908, the subject detection unit 123 performs face detection processing on image data around the center of the screen. If it is determined that there is a face that has been detected around the center of the screen (YES in step S908), the subject detection unit 123 determines that the main subject is a human object. In this case, the operation proceeds to step S909. If it is determined that no face has been detected around the center of the screen (NO in step S908), the subject detection unit 123 determines that the main subject is a nonhuman object. In this case, the operation proceeds to step S910. Further, similar to FIG. 9A, the subject detection unit 123 stores the subject information in step S909 or S910. Then, the operation proceeds to step S911. In step S911, the subject detection unit 123 causes the display unit 109 to display the subject tracking frame (i.e., the nonhuman object tracking frame 400 or the face tracking frame 500). Then, the subject detection unit 123 terminates the subject designation processing illustrated in FIG. 9B.

The processing to be performed in steps S909 through S911 is similar to the processing performed in steps S903 through S905 illustrated in FIG. 9A except that the subject detection area is located around the center of the screen. Therefore, redundant description thereof will be avoided. When the above-mentioned method described with reference to the flowchart illustrated in FIG. 9B is employed, each photographer can easily designate a subject to be followed up even when the camera does not include any operation member (e.g., a touch panel).

FIG. 9C is a flowchart illustrating an example of the designation processing that can be performed to automatically select a subject to be followed up from a plurality of faces detected when the FA zoom operation switch (i.e., the member of the operation unit 117) is pressed for a short time. In step S912, the subject detection unit 123 performs face detection processing on image data of the entire screen. If it is determined that at least one face has been detected in the entire screen (YES in step S912), the subject detection unit 123 determines that the main subject is a human object, and the operation proceeds to step S913.

In step S913, if the number of detected faces is only one, the subject detection unit 123 designates the detected face as a main face. If a plurality of faces has been detected, the subject detection unit 123 selects a main face to be designated as a subject to be followed up from the detected faces. For example, as a determination standard usable in the main face selection, the subject detection unit 123 can designate a detected face as a main face if the detection position thereof is around the center of the screen. In a case where two or more faces are comparable in the detection position, the subject detection unit 123 can select a detected face as a main face if the size is larger than the rest. Further, when the camera has the face authentication function, the subject detection unit 123 can preferentially select a face being authentication registered as a main face.

In step S914, the subject detection unit 123 stores face information about the selected main face in the memory 118. After the subject detection unit 123 completes the storage of the face information in step S914, the operation proceeds to step S915. In step S915, the subject detection unit 123 causes the display unit 109 to display the face tracking frame 500. In step S916, if the main face automatically selected from the plurality of faces is a face that is not intended by the photographer, the photographer can change the main face. In this case, the photographer can press the switch (e.g., the FA zoom operation switch or another switch) of the operation unit 117 to change the main face to a new face that is not yet selected as the main face from the detected faces. In this manner, the face tracking frame 500 can be updated. If it is determined that the main face has been changed (YES in step S916), the operation proceeds to step S914 again. The subject detection unit 123 updates the face information to be stored. Then, in step S915, the subject detection unit 123 changes the face tracking frame 500 according to the size and the detection position of the newly selected main face.

If it is determined that no face has been detected in the entire screen (NO in step S912), the subject detection unit 123 determines that the main subject is a nonhuman object, and the operation proceeds to step S917. In step S917, the subject detection unit 123 stores a characteristic color around the center of the screen as color information about the automatic tracking target in the memory 118. After the subject detection unit 123 completes the storage of the color information in step S917, the operation proceeds to step S918. In step S918, the subject detection unit 123 causes the display unit 109 to display the nonhuman object tracking frame 400. Then, the subject detection unit 123 terminates the subject designation processing illustrated in FIG. 9C.

The processing to be performed in steps S914, S915, S917, and S918 is similar to the processing performed in steps S903 through S905 illustrated in FIG. 9A, except that the subject detection area is the entire screen if the target is a face or the central region of the screen if the target is a color. Therefore, redundant description thereof will be avoided. When the above-mentioned method described with reference to the flowchart illustrated in FIG. 9C is employed, each photographer can easily designate a subject to be followed up with a smaller number of operations.

After the subject detection unit 123 terminates the subject designation processing, the operation proceeds to step S805 illustrated in FIG. 8. In steps S805 through S807, the subject detection unit 123 determines whether to start the FA zoom operation based on the standard subject information designated at the subject designation timing and periodically detected subject information. The subject detection unit 123 repeats the above-mentioned determination processing at predetermined control intervals until the FA zoom start condition can be satisfied.

In step S805, the subject detection unit 123 determines whether a subject that has characteristics similar to the standard subject information has been detected in the entire screen. More specifically, if the standard subject is a human object, the subject detection unit 123 determines whether a characteristically similar face has been detected. If the standard subject is a nonhuman object, the subject detection unit 123 determines whether a characteristically similar color has been detected. If it is determined that the subject to be followed up has not been detected (YES in step S805), the operation proceeds to step S809. On the other hand, if it is determined that the subject to be followed up has been detected (YES in step S805), the operation proceeds to step S806.

In step S806, the subject detection unit 123 determines whether the subject tracking frame of the subject to be followed up is included in the zoom-out area illustrated in FIG. 4A. If it is determined that the tracking frame is included in the zoom-out area, more specifically, when the subject is positioned in the vicinity of a peripheral region of the screen and may go out of the frame (YES in step S806), the operation proceeds to step S808. In step S808, the subject detection unit 123 determines to start the FA zoom operation. If it is determined that the subject tracking frame is not included in the zoom-out area, more specifically, when the subject is positioned around the center of the screen (NO in step S806), the operation proceeds to step S807.

Next, in step S807, the subject detection unit 123 compares the subject size of the standard subject information with the subject size detected in step S805. If it is determined that the subject size detected in step S805 is greater than a predetermined multiple value of the standard subject size (YES in step S807), the operation proceeds to step S808. In step S808, the subject detection unit 123 determines to start the FA zoom operation. After the subject detection unit 123 completes the FA zoom start determination processing in step S808, the operation proceeds to step S701 illustrated in FIG. 7 to start the zoom-out operation.

On the other hand, if it is determined that the subject has not been detected (NO in step S805), then in step S809, the FA zoom control unit 122 determines whether a predetermined time has elapsed. If it is determined that the predetermined time has not elapsed yet (NO in step S809), then in step S810, the FA zoom control unit 122 determines whether the FA zoom operation switch has been pressed. Further, if it is determined that the subject detected in step S805 is positioned around the center of the screen, and the subject size is smaller than the predetermined multiple value of the standard subject size (NO in step S807), then in step S810, the FA zoom control unit 122 determines whether the FA zoom operation switch has been pressed. If it is determined that the FA zoom operation switch has not been pressed (NO in step S810), the operation returns to step S805 to repeat the loop processing in steps S805, S809, and S810. If it is determined that the predetermined time has elapsed in a state where the subject has not been detected (YES in step S809), the operation proceeds to step S804 to perform the subject designation processing again. If it is determined that the FA zoom operation switch has been pressed (YES in step S810), the operation proceeds to step S811.

In step S811, the FA zoom control unit 122 determines whether the FA zoom operation switch has been released within a predetermined time since the pressing timing of the switch. If it is determined that the FA zoom operation switch has been released within the predetermined time (YES in step S811), the FA zoom control unit 122 determines that the automatic tracking mode has been cancelled, and terminates the FA zoom function processing illustrated in FIG. 8. On the other hand, if it is determined that the FA zoom operation switch has not been released within the predetermined time (NO in step S811), the operation proceeds to step S802 in which the manual search mode is stored. More specifically, if the FA zoom operation switch has been pressed continuously for the predetermined time in the automatic tracking mode, the camera according to the present exemplary embodiment changes the FA mode to the manual search mode.

Figure 10A:
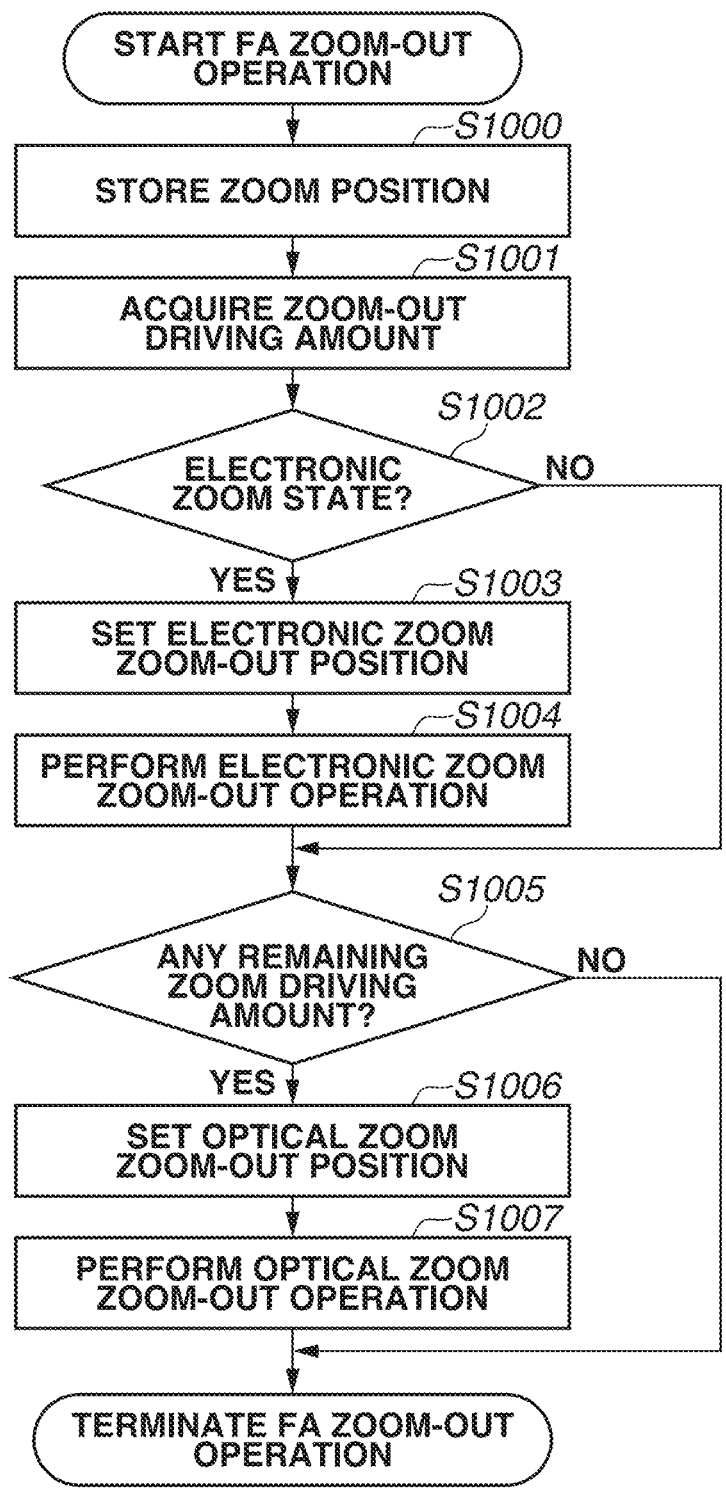
FIGS. 10A and 10B are flowcharts illustrating a zoom-out operation and a zoom-in operation that can be performed by the camera.

FIG. 10A is a flowchart illustrating the FA zoom-out operation processing to be performed in step S701 illustrated in FIG. 7. In step S1000, the FA zoom control unit 122 acquires the optical zoom position in the shooting preparation state (i.e., before starting the zoom movement) from the CZ control unit 119, and acquires the electronic zoom position from the electronic zoom control unit 120. Further, the FA zoom control unit 122 stores the acquired information indicating the optical zoom position and the electronic zoom position in the memory 118. The optical zoom position represents the position of the zoom lens, which corresponds to a zoom magnification that is changeable according to the optical zoom function. The electronic zoom position represents the control position, which corresponds to an image enlargement/reduction magnification that is changeable according to the electronic zoom function. When the FA mode is the manual search mode, the zoom position stored at that time is set as the zoom return position.

In step S1001, the FA zoom control unit 122 acquires a zoom-out driving amount stored in the memory 118. The zoom-out driving amount in the automatic tracking mode is set according to the size of the detected subject. More specifically, when the size of the subject is smaller, the zoom-out driving amount is set to be smaller. Considering a minimum size that can be detected as a subject, the FA zoom control unit 122 does not perform the zoom-out operation if the size of the subject is smaller than a predetermined size. Further, a setting menu can be configured to enable a photographer to change the zoom-out driving amount in the manual search mode.

In step S1002, the FA zoom control unit 122 determines whether the zoom state in the shooting preparation state is an electronic zoom state. In a general zoom operation, the optical zoom driving is performed under the control of the CZ control unit 119 if the zoom operation switch of the operation unit 117 is pressed, in a state where the optical zoom position is located between the wide angle end and the telephoto end. If an instruction to zoom toward the telephoto direction is input in a state where the optical zoom position is the telephoto end, the electronic zoom control unit 120 drives the electronic zoom to perform a super telephoto shooting operation. For the consistency between the zoom operation based on an operation using the zoom operation switch and the FA zoom operation, driving the electronic zoom is prioritized even in the FA zoom operation if the zoom state in the shooting preparation state is the electronic zoom state. More specifically, the FA zoom control unit 122 determines whether the zoom position stored in the memory 118 is in the zoom area of the zoom state to be prioritized. In the present example, the electronic zoom is prioritized. Therefore, in step S1002, the FA zoom control unit 122 determines whether the zoom position is in the electronic zoom area.

If it is determined that the zoom state at the FA zoom start timing is the electronic zoom state (YES in step S1002), the operation proceeds to step S1003. In step S1003, the FA zoom control unit 122 calculates the zoom-out position of the electronic zoom based on the electronic zoom position acquired in step S1000 and the zoom-out driving amount acquired in step S1001. The FA zoom control unit 122 sets the calculated electronic zoom zoom-out position to the electronic zoom control unit 120. In step S1004, the FA zoom control unit 122 instructs the electronic zoom control unit 120 to perform magnification varying processing in such a way as to reach the electronic zoom zoom-out position having been set in step S1003. The electronic zoom control unit 120 performs an electronic zoom based zoom-out operation.

If it is determined that the zoom position in the shooting preparation state is in an optical zoom area (NO in step S1002), after the electronic zoom based zoom-out operation in step S1004 has been completed, the operation proceeds to step S1005. In step S1005, the FA zoom control unit 122 determines whether it is necessary to additionally perform an optical zoom based zoom-out operation. More specifically, in a case where performing only the electronic zoom is insufficient to realize a zoom driving operation comparable to the zoom-out driving amount having been set, it is necessary to additionally perform the optical zoom to compensate the remaining zoom-out driving amount. If it is determined that the optical zoom based zoom-out operation is necessary (YES in step S1005), the operation proceeds to step S1006. In step S1006, the FA zoom control unit 122 calculates an optical zoom based zoom-out position based on the optical zoom position and the zoom-out driving amount and sets the calculated optical zoom based zoom-out position to the CZ control unit 119.

In step S1007, the FA zoom control unit 122 instructs the CZ control unit 119 to perform a zoom driving operation so as to reach the optical zoom based zoom-out position having been set in step S1006. The CZ control unit 119 controls the zoom lens driving unit 113 to perform an optical zoom based zoom-out operation.

If the above-mentioned FA zoom-out operation has been completed, the operation proceeds to step S702 illustrated in FIG. 7. In step S702, the FA zoom control unit 122 instructs the FA zoom frame control unit 121 to display the FA zoom frame 300 corresponding to the zoom return position. In a case where the selected mode is the automatic tracking mode, the FA zoom control unit 122 stores a zoom position in a telephoto direction that corresponds to a predetermined multiple of the present angle of view, as the zoom return position, in the memory 118. Further, the FA zoom control unit 122 causes the display unit 109 to display an FA zoom frame that corresponds to the stored angle of view. On the other hand, in a case where the selected mode is the manual search mode, the FA zoom control unit 122 causes the display unit 109 to display an FA zoom frame of an angle of view that corresponds to the zoom position at the FA zoom-out start timing stored in step S1000 illustrated in FIG. 10A. When the display of the FA zoom frame is completed, the camera is brought into the subject search state. Then, the operation proceeds to step S703 to perform zoom return position change processing.

Figure 11:
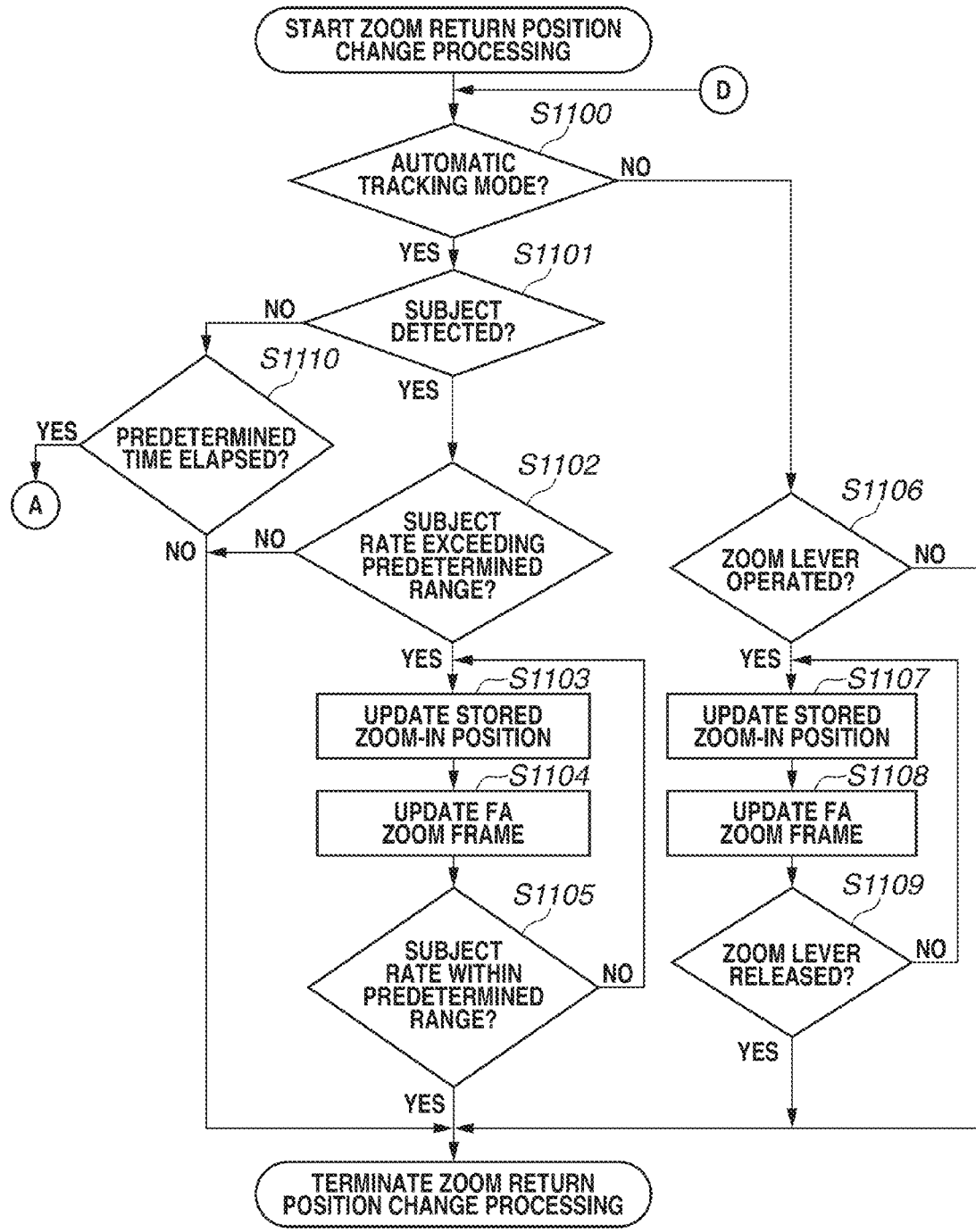
FIG. 11 is a flowchart illustrating zoom return position change processing that can be performed by the camera.

FIG. 11 is a flowchart illustrating the zoom return position change processing to be performed in step S703 illustrated in FIG. 7. In step S1100, the FA zoom control unit 122 determines whether the mode stored in step S802 or S803 in the FA zoom start determination processing illustrated in FIG. 8 is the automatic tracking mode (is not the manual search mode). If it is determined that the stored mode is the manual search mode (NO in step S1100), the operation proceeds to step S1106. When the stored mode is the manual search mode, it is feasible for a photographer to change the zoom return position stored in step S1000 illustrated in FIG. 10A and the FA zoom frame 300 by operating the zoom lever.

In step S1106, the FA zoom control unit 122 determines whether the zoom lever of the operation unit 117 has been moved toward the telephoto direction or the wide angle direction. If it is determined that the zoom lever has been operated (YES in S1106), the operation proceeds to step S1107. If it is determined that the zoom lever is not yet operated (NO in S1106), the FA zoom control unit 122 terminates the processing of the flowchart illustrated in FIG. 11. In step S1107, the FA zoom control unit 122 updates the zoom return position (zoom-in position) stored in the memory 118 in step S1000, before starting the zoom-out operation, according to the operation direction determined in step S1106 by a predetermined amount toward the telephoto direction or the wide angle direction. Then, the operation proceeds to step S1108. In step S1108, the FA zoom control unit 122 updates the display of the FA zoom frame 300 in such a way as to indicate an angle of view that corresponds to the zoom return position updated in step S1107. Then, the operation proceeds to step S1109.

In step S1109, the FA zoom control unit 122 determines whether the zoom lever of the operation unit 117 has been released. If it is determined that the zoom lever is not yet released (NO in step S1109), the FA zoom control unit 122 continues the processing in steps S1107 through S1109. If it is determined that the zoom lever has been released (YES in step S1109), the FA zoom control unit 122 terminates the processing of the flowchart illustrated in FIG. 11. Through the above-mentioned processing, even in a case where the size of a subject displayed on the display unit 109 varies according to an approaching movement of the subject after the zoom-out operation is completed, a photographer can change the zoom return position with a simple operation and can easily perform the framing operation.

In the determination of step S1100, if it is determined that the mode is the automatic tracking mode (YES in step S1100), the operation proceeds to step S1101. When the mode is the automatic tracking mode, it is feasible to automatically change the zoom return position stored in the memory 118 and the FA zoom frame 300 so as to locate the subject within an appropriate angle of view after the zoom-in operation is completed, based on a subject size detected by the camera.

The appropriate angle of view in the present exemplary embodiment is holding an angle of view in such a manner that an occupation rate of a subject in the entire screen becomes comparable to the standard subject size designated in step S804 illustrated in FIG. 8. In step S1101, the FA zoom control unit 122 determines whether a subject having face information or color information that corresponds to the standard subject information has been detected. If it is determined that the subject to be followed up has been detected (YES in step S1101), the operation proceeds to step S1102. If it is determined that the subject to be followed up is not yet detected (NO in step S1101), the operation proceeds to step S1110. In step S1110, the FA zoom control unit 122 determines whether a predetermined time has elapsed in a state where the subject has not been detected. If it is determined that the predetermined time has not elapsed yet (NO in step S1110), the FA zoom control unit 122 terminates the processing of the flowchart illustrated in FIG. 11. If it is determined that the predetermined time has elapsed (YES in step S1110), the operation proceeds to step S804 illustrated in FIG. 8 to perform the subject designation processing again.

In step S1102, the FA zoom control unit 122 compares a rate of the standard subject size relative to the entire screen with an occupation rate of the subject detected in step S1101 in the FA zoom frame 300 (i.e., zoom-in angle of view). If the difference between the compared rates exceeds a predetermined range (YES in step S1102), the operation proceeds to step S1103. If the difference between the compared rates is within the predetermined range (NO in step S1102), the FA zoom control unit 122 terminates the processing of the flowchart illustrated in FIG. 11. In step S1103, the FA zoom control unit 122 changes the zoom return position stored in the memory 118. More specifically, the FA zoom control unit 122 shifts the zoom return position toward the wide angle direction by a predetermined amount if the subject size detected in step SS1101 is larger than the standard subject size. The FA zoom control unit 122 shifts the zoom return position toward the telephoto direction by a predetermined amount if the subject size detected in step SS1101 is smaller than the standard subject size. Then, the operation proceeds to step S1104.

In step S1104, the FA zoom control unit 122 updates the display of the FA zoom frame 300 in such a way as to indicate an angle of view that is comparable to the zoom return position updated in step S1103. Then, the operation proceeds to step S1105. In step S1105, the FA zoom control unit 122 determines whether a difference between the rate of the standard subject size relative to the entire screen and the rate of the subject corresponding to the FA zoom frame 300 indicating the updated zoom return position is within a predetermined range. Even when the zoom return position is updated by a predetermined amount, if the difference between the rate of the subject corresponding to the FA zoom frame 300 and the rate of the standard subject exceeds the predetermined range (NO in step S1105), the FA zoom control unit 122 continues the processing in steps S1103, S1104, and S1105 so as to change the zoom return position. If the difference between the rate of the subject corresponding to the FA zoom frame 300 and the rate of the standard subject is within the predetermined range (YES in step S1105), the FA zoom control unit 122 terminates the processing of the flowchart illustrated in FIG. 11.

Through the above-mentioned processing, even in a case where the size of a subject displayed on the display unit 109 varies according to an approaching movement of the subject after the FA zoom-out operation is completed, the camera automatically changes the zoom return position, and the framing operation can be easily performed. According to the example illustrated in FIG. 11, the camera changes the zoom return position based on a manual operation using the zoom lever when the mode is the manual search mode and automatically changes the zoom return position according to a subject size when the mode is the automatic tracking mode. However, the camera can be configured to automatically change the zoom return position when the mode is the manual search mode and manually change the zoom return position when the zoom return position is the automatic tracking mode.

FIG. 12 is a flowchart illustrating the FA zoom termination determination processing to be performed in step S704 illustrated in FIG. 7. In step S1200, the FA zoom control unit 122 determines whether the mode stored in step S802 or step S803 in the FA zoom start determination processing illustrated in FIG. 8 is the automatic tracking mode (is not the manual search mode). If it is determined that the stored mode is the manual search mode (NO in step S1200), the operation proceeds to step S1201. When the stored mode is the manual search mode, the pressing state is continuing in the subject search state after the pressing of the FA zoom operation switch is detected in step S800 or step S810.

In step S1201, the FA zoom control unit 122 determines whether the FA zoom operation switch has been released after a long time pressing of the switch. If it is determined that the FA zoom operation switch has been released (YES in step S1201), the operation proceeds to step S1204. In step S1204, the FA zoom control unit 122 determines to terminate the FA zoom operation. On the other hand, if it is determined that the FA zoom operation switch is not yet released (NO in step S1201), the subject search state is continuing. Therefore, the operation returns to step S1100 illustrated in FIG. 11 in which the FA zoom control unit 122 repeats the zoom return position change processing.

In the determination of step S1200, if it is determined that the stored mode is the automatic tracking mode (YES in step S1200), the operation proceeds to step S1202. In step S1202, the FA zoom control unit 122 determines whether a subject having characteristics similar to the standard subject information designated in step S804 illustrated in FIG. 8 has been detected. More specifically, if the standard subject is a human object, the FA zoom control unit 122 determines whether a face has been detected. If the standard subject is a nonhuman object, the FA zoom control unit 122 determines whether a characteristic color has been detected. If it is determined that the subject to be followed up is not yet detected (NO in step S1202), the operation proceeds to step S1205. If it is determined that the subject to be followed up has been detected (YES in step S1202), the operation proceeds to step S1203.

In step S1203, the FA zoom control unit 122 determines whether the subject tracking frame of the subject to be followed up is included in the zoom-in area illustrated in FIG. 4B. If it is determined that the tracking frame is included in the zoom-in area, more specifically, when the tracking frame is captured in such a way as to have a subject size according to which the subject can be located around the center of the screen within the angle of view of the zoom return position (YES in step S1203), the operation proceeds to step S1204. In step S1204, the FA zoom control unit 122 determines to terminate the FA zoom operation. After the FA zoom termination determination processing in step S1204 completes, the operation proceeds to step S705 illustrated in FIG. 7 in which the FA zoom control unit 122 starts the FA zoom-in operation.

On the other hand, if it is determined that the subject has not been detected (NO in step S1202), then in step S1205, the FA zoom control unit 122 determines whether a predetermined time has elapsed. If it is determined that the predetermined time has not elapsed yet (NO in step S1205), the in step S1206, the FA zoom control unit 122 determines whether the FA zoom operation switch has been pressed. Further, if it is determined that the subject tracking frame of the subject detected in step S1202 is not included in the zoom-in area (NO in step S1203), then in step S1206, the FA zoom control unit 122 determines whether the FA zoom operation switch has been pressed. If it is determined that the FA zoom operation switch is not yet pressed (NO in step S1206), the operation returns to step S1100 illustrated in FIG. 11 in which the FA zoom control unit 122 repeats the zoom return position change processing. If it is determined that the predetermined time has elapsed in the state where the subject has not been detected (YES in step S1205), the operation proceeds to step S804 illustrated in FIG. 8 to perform the subject designation processing again. If it is determined that the FA zoom operation switch has been pressed (YES in step S1206), the operation proceeds to step S1207.

In step S1207, the FA zoom control unit 122 determines whether the FA zoom operation switch has been released within a predetermined time since the pressing timing of the FA zoom operation switch. If it is determined that the FA zoom operation switch has been released within the predetermined time (YES in step S1207), the FA zoom control unit 122 terminates the FA zoom function processing because the automatic tracking mode has been cancelled. On the other hand, if it is determined that the switch has not been released within the predetermined time (NO in step S1207), the operation proceeds to step S802 illustrated in FIG. 8 in which the manual search mode is stored. More specifically, in the present exemplary embodiment, if the FA zoom operation switch has been continuously pressed for a predetermined time in the automatic tracking mode, the FA zoom control unit 122 changes the FA mode to the manual search mode.

Figure 10B:
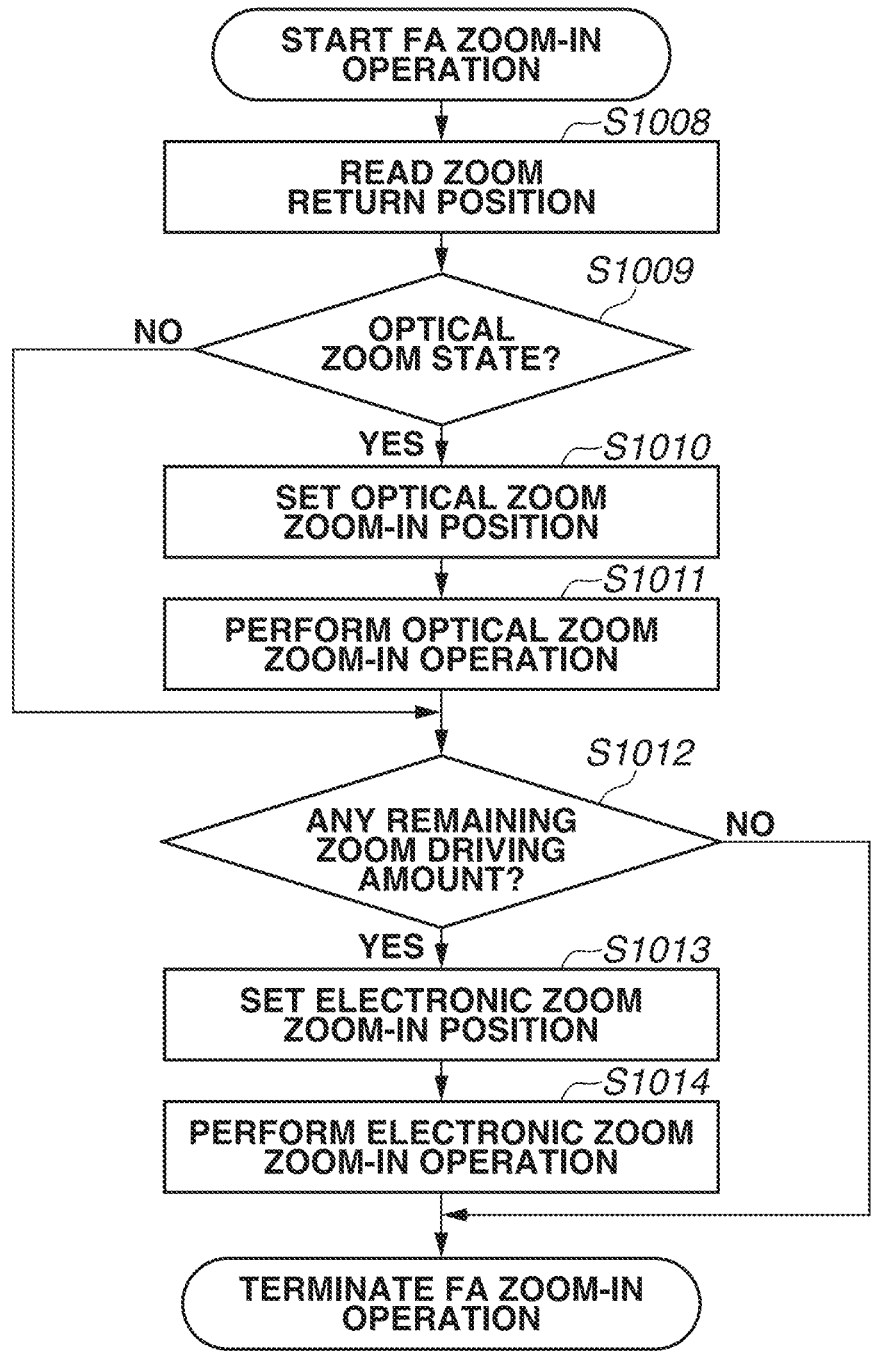

FIG. 10B is a flowchart illustrating zoom-in operation processing to be performed in step S705 illustrated in FIG. 7. In step S1008, the FA zoom control unit 122 reads the zoom position (i.e., zoom return position) data from the memory 118. In step S1009, the FA zoom control unit 122 determines whether the zoom state in the subject search state is in an optical zoom state. If it is determined that the zoom state is the optical zoom state (YES in step S1009), the operation proceeds to step S1010 in which the FA zoom control unit 122 performs an optical zoom prioritized zoom-in operation. If it is determined that the zoom state is the electronic zoom state (NO in step S1009), the operation proceeds to step S1012 to perform an electronic zoom based zoom-in operation.

In step S1010, the FA zoom control unit 122 sets an optical zoom based zoom-in position to the CZ control unit 119 with reference to the zoom return position having been read in step S1008. In step S1011, the FA zoom control unit 122 instructs the CZ control unit 119 to drive the zoom lens 102 so as to reach the optical zoom based zoom-in position having been set in step S1010. The CZ control unit 119 controls the zoom lens driving unit 113 to perform an optical zoom based zoom-in operation.

If it is determined that the zoom position in the subject search state is within the electronic zoom area (NO in step S1009) or after the optical zoom based zoom-in operation has been performed in step S1011, the operation proceeds to step S1012. In step S1012, the FA zoom control unit 122 determines whether an electronic zoom based zoom-in operation is further necessary. If it is determined that the electronic zoom based zoom-in operation is necessary (YES in step S1012), the operation proceeds to step S1013. If it is determined that the electronic zoom based zoom-in operation is unnecessary (NO in step S1012), the FA zoom control unit 122 brings the camera into the shooting preparation state and terminates the processing of the flowchart illustrated in FIG. 10B.

In step S1013, the FA zoom control unit 122 sets an electronic zoom based zoom-in position to the electronic zoom control unit 120 with reference to the zoom return position read in step S1008. In step S1014, the FA zoom control unit 122 instructs the electronic zoom control unit 120 to perform magnification varying processing so as to reach the electronic zoom based zoom-in position having been set in step S1013. The electronic zoom control unit 120 performs an electronic zoom-in operation so as to return to the zoom return position. After the above-mentioned operation has been completed, the FA zoom control unit 122 brings the camera into the shooting preparation state and terminates the processing of the flowchart illustrated in FIG. 10B.

As explained above, the camera according to the present exemplary embodiment sets a zoom-out area and a zoom-in area according to subject information and camera information (e.g., orientation, direction, and shooting state). In particular, when the subject is a human object and a photographer performs a shooting operation while holding the camera in a hand, the camera according to the present exemplary embodiment sets the zoom-out area to be a peripheral area in which the subject tends to go out of the frame, considering the movement and the position of the subject. Further, the camera according to the present exemplary embodiment sets the zoom-out area so as to prevent any unnecessary zoom-out operation. Further, when the subject is a human object and a shooting operation is performed in a handheld state, the camera according to the present exemplary embodiment sets a zoom-in area to be an area in which a photographer can easily perform a re-framing operation, considering the framing operation by the photographer. Through the above-mentioned configuration, a zoom operation for the subject search can be effectively performed according to the orientation of a subject or the camera.

The present invention is not limited to the digital camera or a comparable imaging device. The present invention can be applied to a portable phone, a personal computer (e.g., a laptop computer, a desktop computer, or a tablet computer), a game machine, or any other device that includes a built-in imaging apparatus or is connected to an external imaging apparatus. Accordingly, the "imaging apparatus" according to the present invention includes an arbitrary electronic device that has an imaging function.

Although the present invention has been described with reference to preferable exemplary embodiments, the scene to which the present invention is applicable is not limited to only the adjustment of the angle of view for a still image shooting. For example, the scene to which the present invention is applicable includes the adjustment of the angle of view in a moving image recording operation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153787 filed Jul. 24, 2013 and No. 2014-008876 filed Jan. 21, 2014, which are hereby incorporated by reference herein in their entirety.

What is claimed is:

1. A subject detection apparatus, comprising:
a subject detection unit configured to detect a subject included in an image;
an orientation detection unit configured to detect an orientation of the subject detection apparatus, and
a control unit configured to control a zoom magnification according to an area of the subject detected by the subject detection unit,
wherein the control unit is configured to control the zoom magnification so as to become a zoom magnification in a wide angle direction if the area of the subject detected by the subject detection unit enters a designated area of the image, and
wherein the designated area is set according to a detection result obtained by the orientation detection unit.

2. The subject detection apparatus according to claim 1, wherein the designated area is set in a peripheral region of the image, and an occupation rate of the designated area in a right-and-left direction of the image is smaller than an occupation rate of the designated area in an up-and-down direction of the image, in the orientation of the subject detection apparatus detected by the orientation detection unit.

3. The subject detection apparatus according to claim 1, wherein the designated area is set in a peripheral region of the image and is set in an area that excludes at least a part of an upper edge and a lower edge of the image in the orientation of the subject detection apparatus detected by the orientation detection unit.

4. The subject detection apparatus according to claim 1, wherein the designated area is set in a peripheral region of the image, and the designated area to be set when the orientation detection unit detects that the subject detection apparatus is regularly positioned includes an area that is different from the designated area to be set when the orientation detection unit detects that the subject detection apparatus is vertically positioned.

5. The subject detection apparatus according to claim 1, wherein the orientation detection unit is configured to detect an up-and-down direction of the subject detection apparatus in an orientation detection result obtained by the orientation detection unit, and the designated area is set according to the detected direction in the up-and-down direction of the subject detection apparatus.

6. The subject detection apparatus according to claim 1, wherein if the subject is a human face area, the designated area is set according to an orientation detection result obtained by the orientation detection unit.

7. The subject detection apparatus according to claim 1, further comprising:
a shake detection unit configured to detect a shake amount of the subject detection apparatus,
wherein if the shake amount detected by the shake detection unit is smaller than a predetermined amount, the designated area is set without taking a detection result obtained by the orientation detection unit into consideration.

8. The subject detection apparatus according to claim 1, further comprising:
a setting unit configured to set an aspect ratio of the image,
wherein if the setting unit changes the aspect ratio of the image, the designated area is set in a non-recorded area of the image that is generated according to the change of the aspect ratio.

9. The subject detection apparatus according to claim 8, wherein the zoom magnification in the wide angle direction is set based on a change or orientation in an up-and-down direction or a right-and-left direction of the image before and after the aspect ratio is changed by the setting unit.

10. A subject detection apparatus, comprising:
a subject detection unit configured to detect a subject included in an image;
an orientation detection unit configured to detect an orientation of the subject detection apparatus; and
a control unit configured to control a zoom magnification according to an area of the subject detected by the subject detection unit,
wherein the control unit is configured to control the zoom magnification so as to become a zoom magnification in a telephoto direction if the area of the subject detected by the subject detection unit is included in a designated area of the image, and
wherein the designated area is set according to a detection result obtained by the orientation detection unit.

11. The subject detection apparatus according to claim 10, wherein the designated area is set around the center of the image in a right-and-left direction, and an occupation rate of the designated area in the right-and-left direction of the image is smaller than an occupation rate of the designated area in an up-and-down direction of the image, in the orientation of the subject detection apparatus detected by the orientation detection unit.

12. The subject detection apparatus according to claim 10, wherein the designated area is set so as to include at least a part of an upper edge and a lower edge of the image, in the orientation of the subject detection apparatus detected by the orientation detection unit.

13. The subject detection apparatus according to claim 10, wherein the designated area is an area set around the center of the image in a right-and-left direction, in the orientation of the subject detection apparatus detected by the orientation detection unit, and the designated area to be set when the orientation detection unit detects that the subject detection apparatus is horizontally positioned includes an area that is different from the designated area to be set when the orientation detection unit detects that the subject detection apparatus is vertically positioned.

14. The subject detection apparatus according to claim 10, wherein the orientation detection unit is configured to detect an up-and-down direction of the subject detection apparatus in an orientation detection result obtained by the orientation detection unit, and the designated area is set according to the detected direction in the up-and-down direction of the subject detection apparatus.

15. The subject detection apparatus according to claim 10, wherein if the subject is a human face area, the designated area is set according to a detection result obtained by the orientation detection unit.

16. The subject detection apparatus according to claim 10, further comprising:
a shake detection unit configured to detect a shake amount of the subject detection apparatus,
wherein if the shake amount detected by the shake detection unit is smaller than a predetermined amount, the designated area is set without taking a detection result obtained by the orientation detection unit into consideration.

17. The subject detection apparatus according to claim 10, wherein if the subject detected by the subject detection unit at a first zoom magnification is included in a second area of the image, the control unit is configured to control the zoom magnification to become a second zoom magnification in a telephoto direction, and
wherein the second area is set according to a detection result obtained by the orientation detection unit.

18. The subject detection apparatus according to claim 17, wherein the control unit is configured to store a zoom magnification value set before starting the change to the first zoom magnification, and if the subject detected by the subject detection unit at the first zoom magnification is included in the second area of the image, the control unit controls the zoom magnification so as to become the stored zoom magnification.

19. A method for controlling a subject detection apparatus, comprising:
detecting a subject included in an image;
detecting an orientation of the subject detection apparatus; and
controlling a zoom magnification according to an area of the detected subject,
wherein, if the area of the detected subject enters a designated area of the image, the zoom magnification is controlled to become a zoom magnification in a wide angle direction, and
wherein the designated area is set according to an orientation detection result.

20. A non-transitory computer-readable storage medium storing a control program that causes a computer to execute a method for controlling a subject detection apparatus according to claim 19.

21. A method for controlling a subject detection apparatus, comprising:
detecting a subject included in an image;
detecting an orientation of the subject detection apparatus; and
controlling a zoom magnification according to an area of the detected subject,
wherein if the area of the detected subject is included in a designated area of the image, the zoom magnification is controlled so as to become a zoom magnification in a telephoto direction, and
wherein the designated area is set according to an orientation detection result.

22. A non-transitory computer-readable storage medium that stores a control program that causes a computer to execute a method for controlling a subject detection apparatus according to claim 21.

* * * * *